(12) United States Patent
Antonovsky

(10) Patent No.: US 6,899,206 B2
(45) Date of Patent: May 31, 2005

(54) AIR CYLINDER WITH HIGH FREQUENCY SHOCK ABSORBER AND ACCELERATOR

(76) Inventor: Yevgeny Antonovsky, 2676 W. 3rd St., Brooklyn, NY (US) 11223

( * ) Notice: Subject to any disclaimer, the term of this patent is extended or adjusted under 35 U.S.C. 154(b) by 0 days.

(21) Appl. No.: 10/875,375

(22) Filed: Jun. 23, 2004

(65) Prior Publication Data
US 2004/0262827 A1 Dec. 30, 2004

Related U.S. Application Data

(60) Provisional application No. 60/482,701, filed on Jun. 26, 2003.

(51) Int. Cl.⁷ .................................................. F16F 9/49
(52) U.S. Cl. ...................... 188/280; 188/286; 188/315; 188/322.13; 267/64.11; 267/124; 267/226; 267/64.28
(58) Field of Search ................................ 188/280, 286, 188/284, 315, 287, 322.13; 267/64.11, 124, 226, 139, 64.28, 64.26, 64.25, 113, 114, 119, 116, 64.18, 64.22, 130, 64.1

(56) References Cited

U.S. PATENT DOCUMENTS 2,332,520 A * 10/1943 Lucht .......................... 188/285
3,136,225 A * 6/1964 Rader ........................... 91/395
5,069,317 A * 12/1991 Stoll et al. .................... 188/286

* cited by examiner

Primary Examiner—Robert A. Siconolfi
Assistant Examiner—Melanie Torres
(74) Attorney, Agent, or Firm—Steven Horowitz

(57) ABSTRACT

High frequency shock absorber/accelerator built in at any or both end of conventional air cylinder that includes piston moving axially inside cylinder body and sealed against inner surface of body by sealing structure. Cylinder piston rod protrudes outside thru cylinder front-end block Shock absorber/accelerator comprises piston with sealing structures moving axially in inner chamber, which communicates with outer chamber thru aperture(s). Air cylinder piston meets the protruded rod of the shock absorber/accelerator piston and starts to move it thus pushing volume of compressed air through provided aperture from inner chamber to outer chamber. Piston sealing structures seal air coming through the aperture thereby isolating compressed air in the outer chamber from the inner chamber. Compressed air coming through the open venting valve forces pistons to move in opposite direction. Then, shock absorber/accelerator aperture opens and compressed air rushes back from the outer to the inner chamber for powerful acceleration.

14 Claims, 20 Drawing Sheets

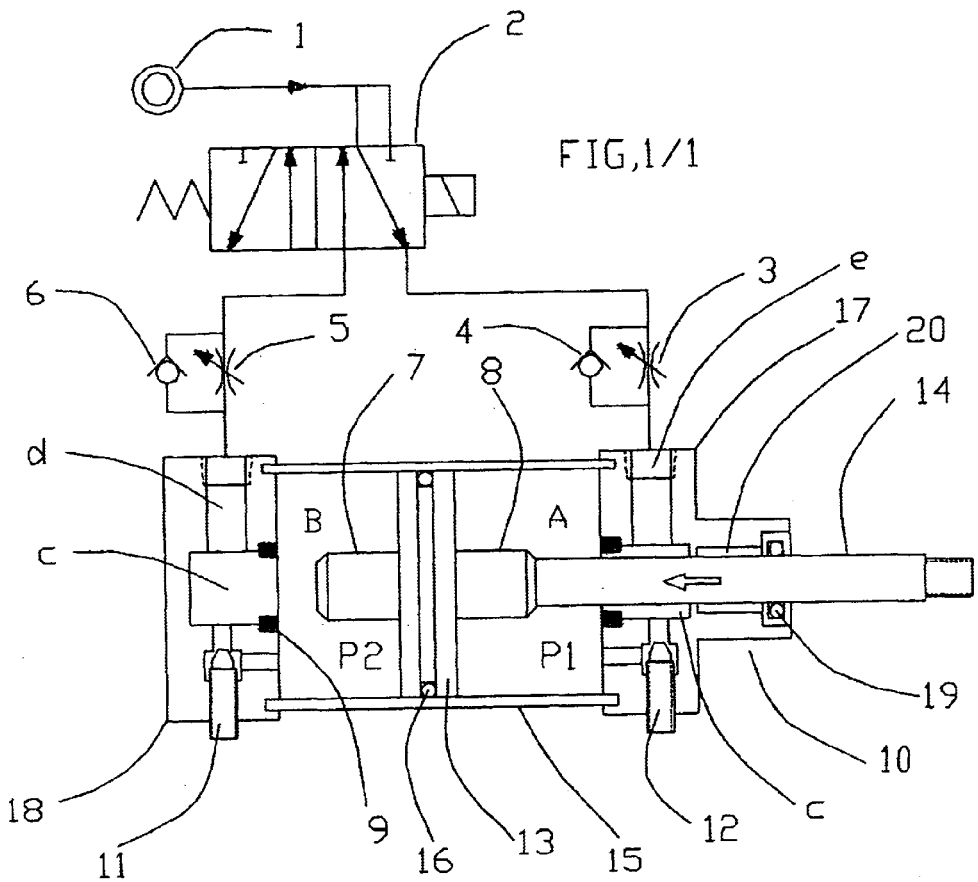
FIG.1/1
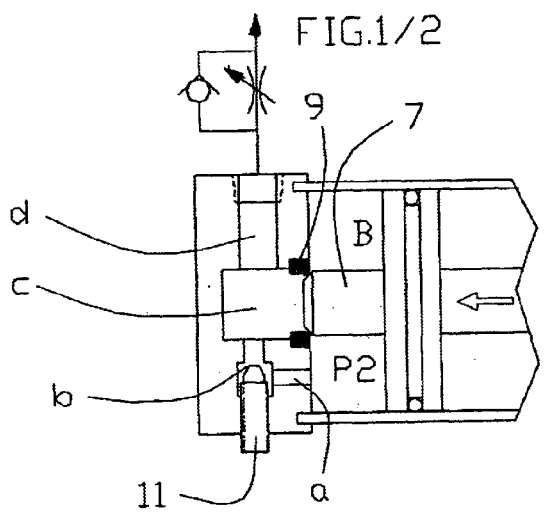
FIG.1/2
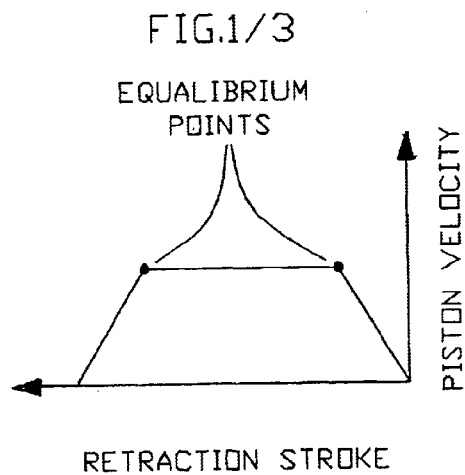
FIG.1/3
FIG.1 PRIOR ART

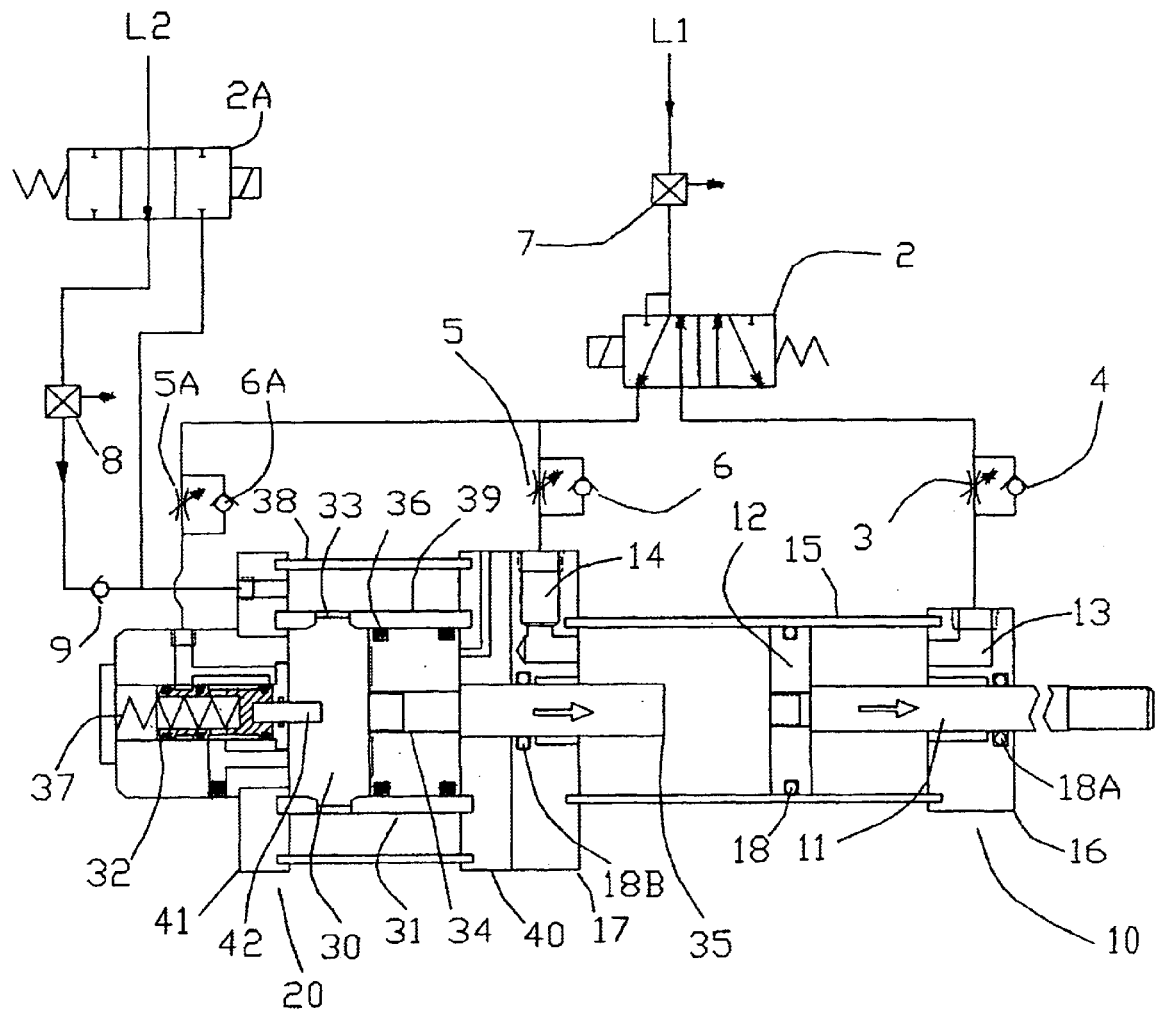
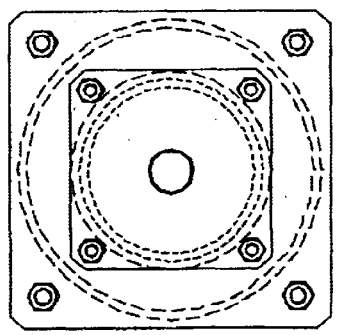
FIG.2

FRONT VIEW

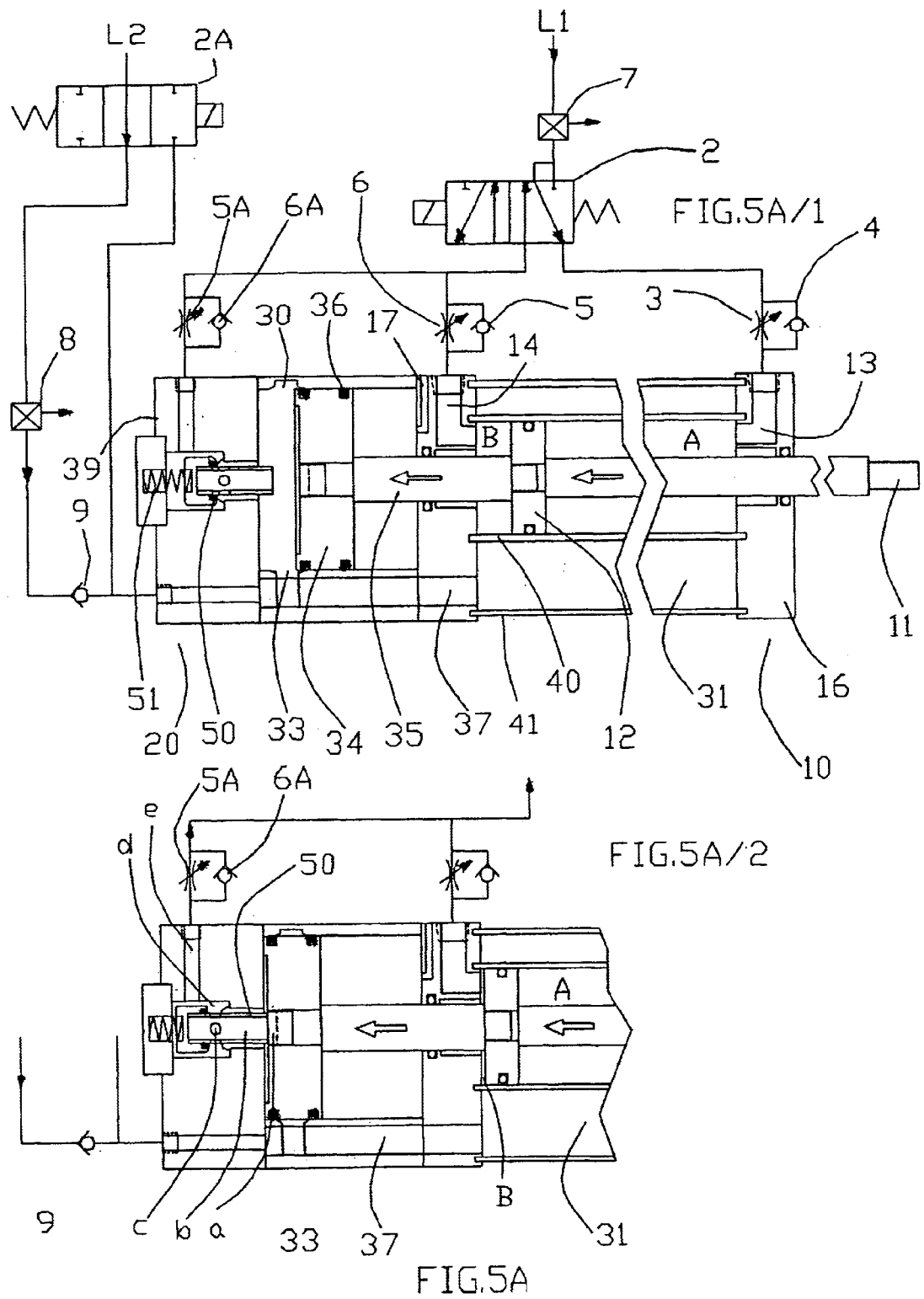

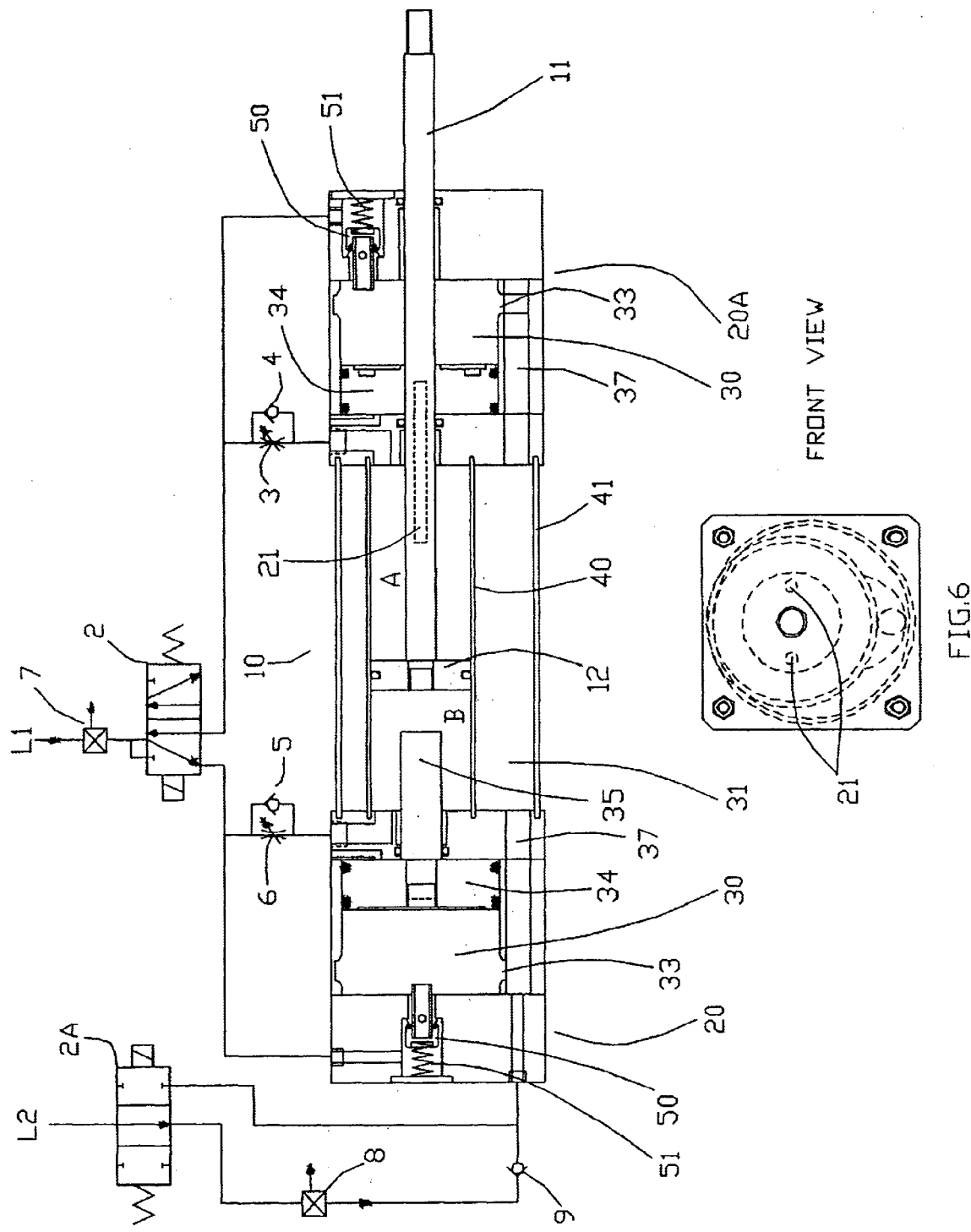

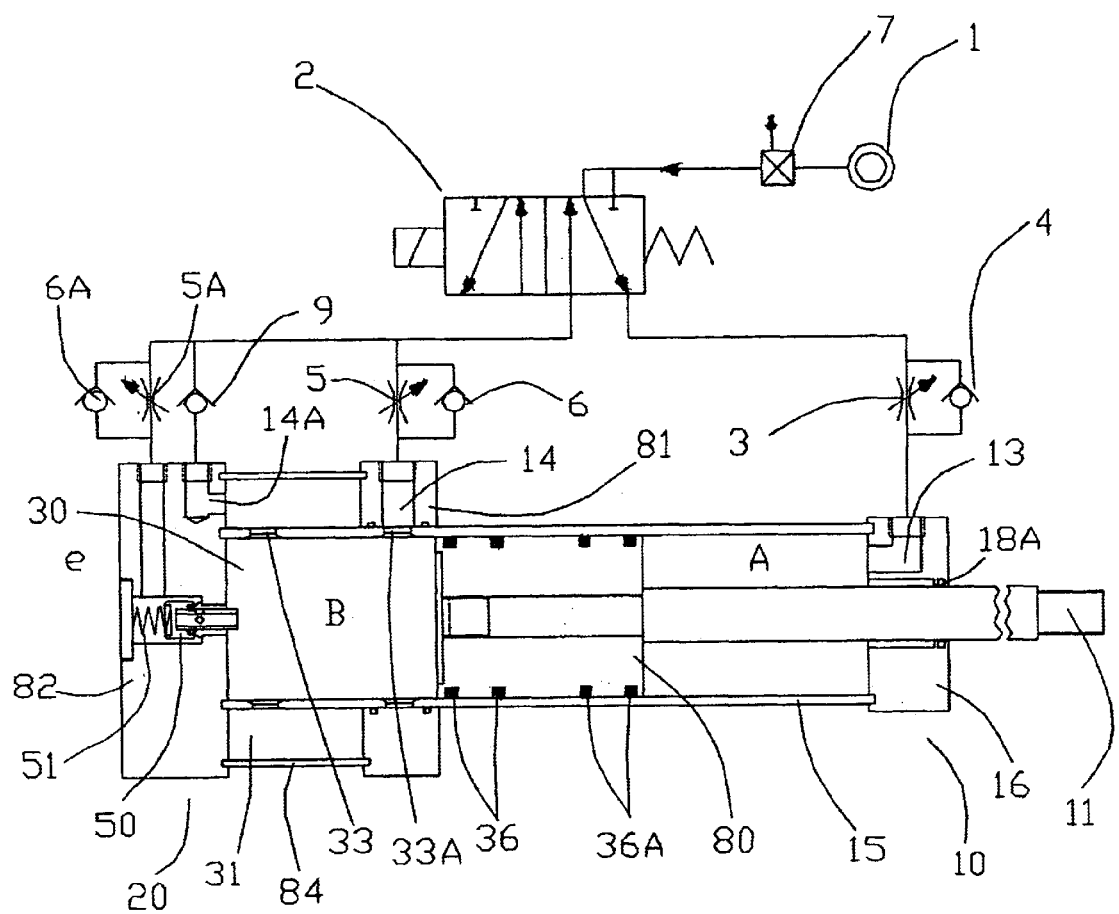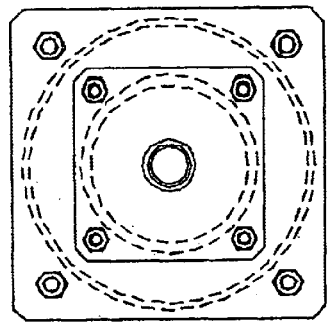
FRONT VIEW
FIG.9

FRONT VIEW

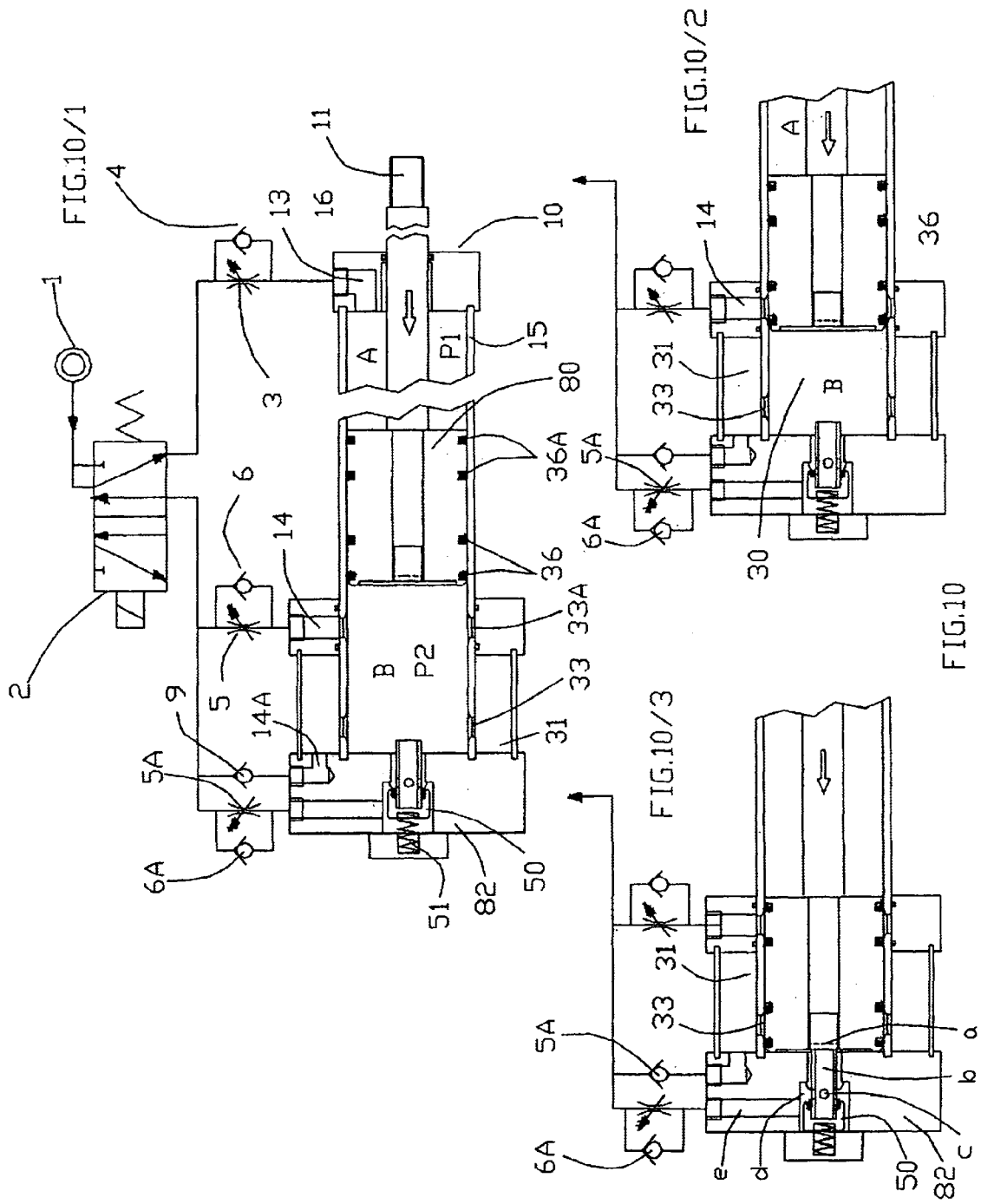

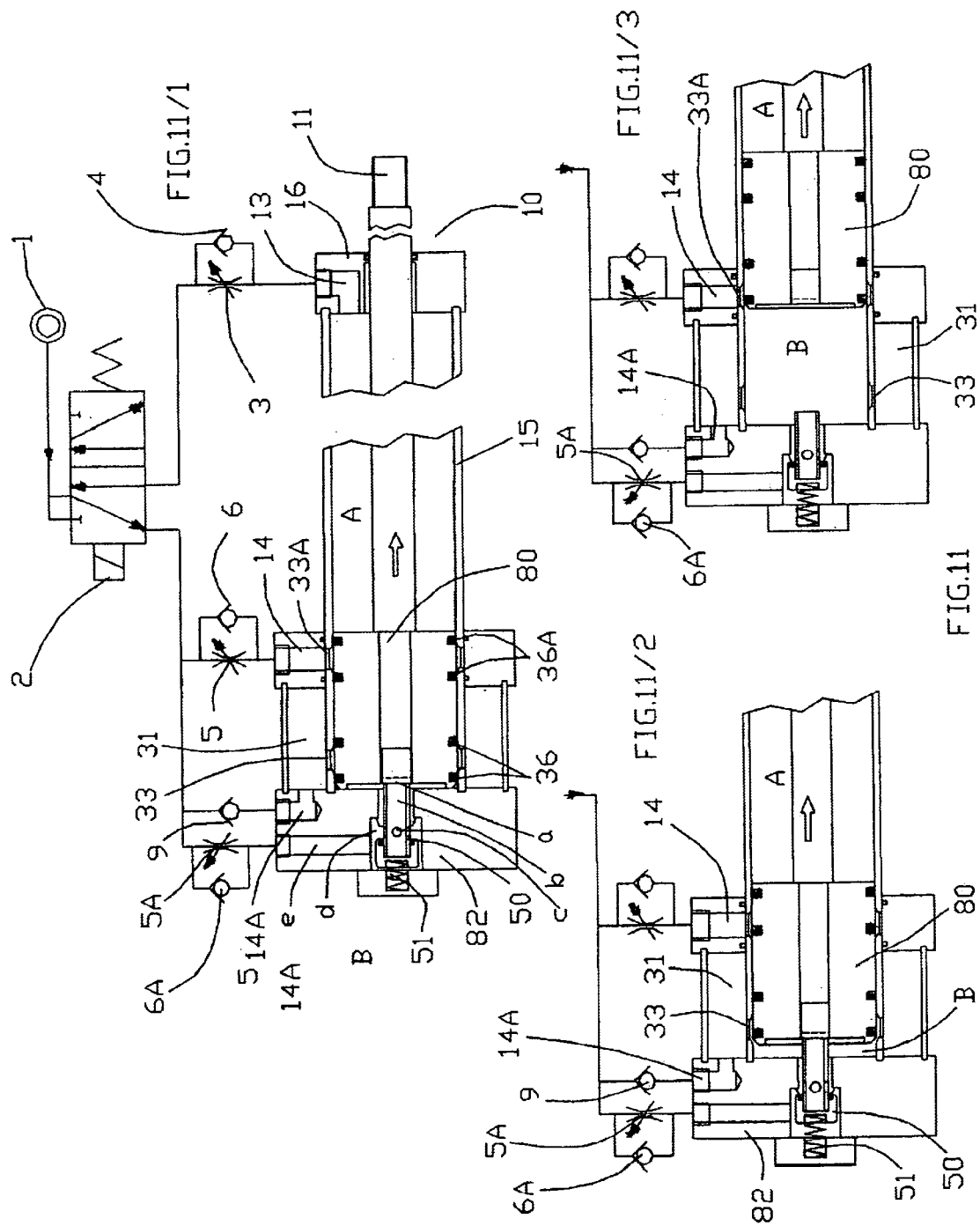

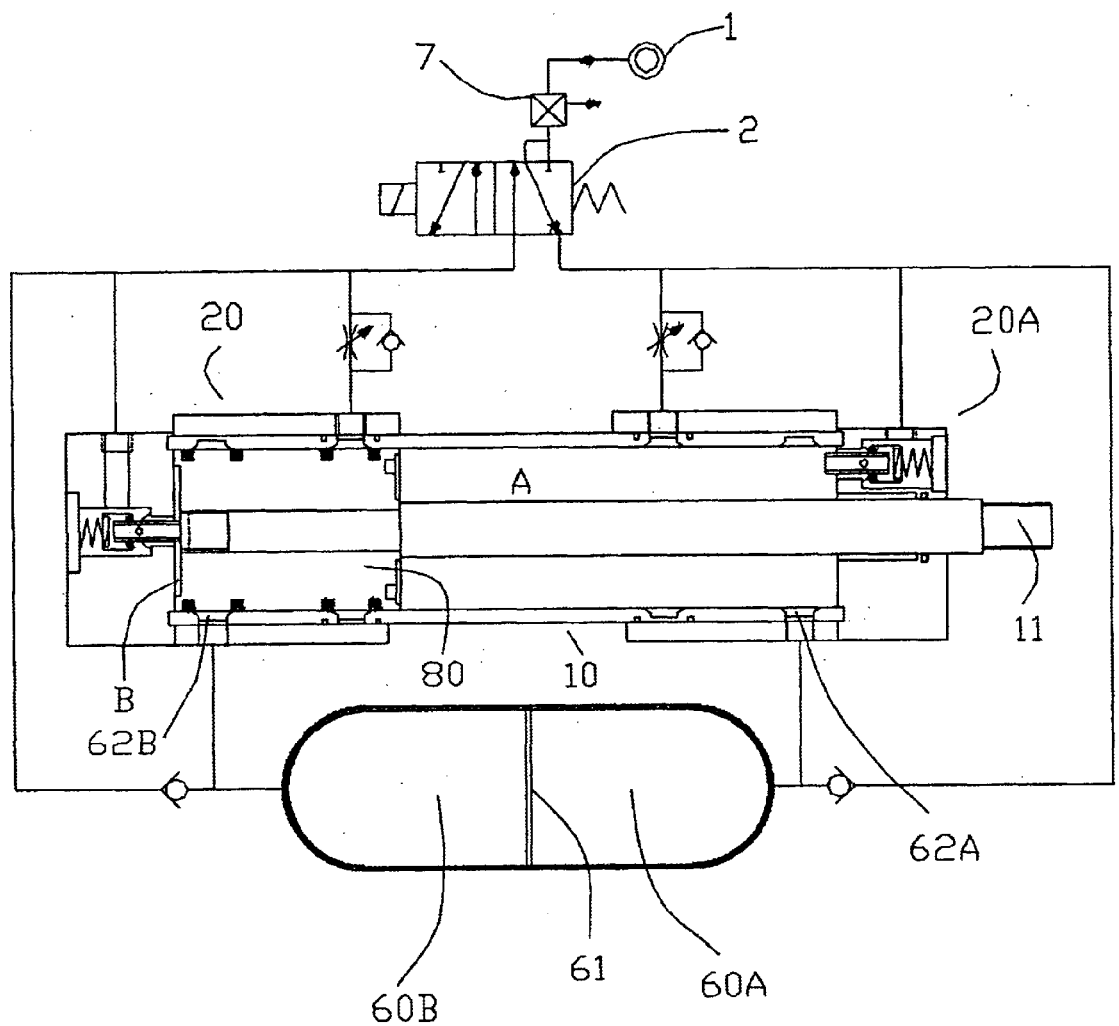
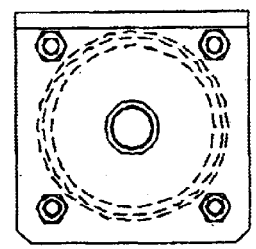
FRONT VIEW
FIG.13

ENLARGED

FRONT VIEW

AIR CYLINDER WITH HIGH FREQUENCY SHOCK ABSORBER AND ACCELERATOR

This nonprovisional patent application is a continuation of pending U.S. provisional patent application No. 60/482,701 entitled Air Cylinder with High Frequency Shock Absorber and Accelerator filed Jun. 26, 2003 by Applicant Yevgeny Antonovksy. This nonprovisional patent application also claims priority from and completely incorporates by reference the previously filed U.S. patent application Ser. No. 09/978,938 entitled High frequency Shock Absorber and Accelerator by Yevgeny Antonovsky filed Oct. 17, 2001 and which has issued as U.S. Pat. No. 6,454,061 B1 on Sep. 24, 2003 as U.S. Pat. No. 6,612,410 B1 on Sep. 2, 2003.

SUMMARY

The present invention is for an air (i.e. gas) cylinder, which combines conventional air cylinder and high frequency shock absorber/accelerator built-in at any one or both cylinder ends. Conventional air cylinder comprises cylinder body with piston moving axially inside of this body and sealed against body inner surface by sealing structure. Piston divides cylinder body in two chambers communicating with outside thru inlets (outlets). Cylinder piston rod protrudes outside through the front-end block, is sealed against this block by sealing structure and can be connected to the moving weight.

A high frequency shock absorber/accelerator as described in U.S. Pat. No. 6,454,061 is mounted to any one or both cylinder ends.

Shock absorber/accelerator comprises piston with sealing structures moving axially in inner chamber, which communicates with outer chamber thru aperture(s) or air line. Venting valve is mounted in shock absorber/accelerator rear end block. Shock absorber/accelerator piston rod protrudes through the front end block into adjacent air cylinder chamber. At a certain point of the stroke, air cylinder piston meets the protruded rod of the shock absorber/accelerator piston and starts to move it, thus pushing exact volume of compressed air from the shock absorber/accelerator's inner chamber to the outer chamber through provided aperture.

During this process, air (gas) pressure in the shock absorber/accelerator chambers and resistance force applied to the air cylinder piston gradually increase, effectively decelerating moving weight.

As shock absorber/accelerator piston moves further, the sealing structure on the piston seals flow of gas coming through the aperture thereby isolating the compressed air in outer chamber from the inner chamber.

At the end of the stroke, shock absorber/accelerator piston actuates and opens the venting valve. The small amount of compressed air remaining in the inner chamber is pushed outside through this valve, leaving shock absorber/accelerator and air cylinder pistons loaded just by small return force generated by the valve spring.

After directional control valve changes the direction of the compressed air flow, the compressed air is introduced through the venting valve into the shock absorber/accelerator's inner chamber and to the cylinder pressurized (formerly discharged) chamber through the inlet port. As a result, shock absorber/accelerator piston and air cylinder piston start to move simultaneously in the opposite direction.

After a short travel shock, absorber/accelerator aperture opens and stored under high-pressure compressed air rushes back into the inner chamber, thus powerfully accelerating shock absorber/accelerator and air cylinder pistons with attached weight.

After shock absorber/accelerator piston stops against the end block, acceleration phase is almost accomplished and the air cylinder piston with attached weight continues to move with low/moderate air pressure in the pressurized chamber until stroke is completed. Additional embodiments include different modifications of the outer chamber and venting valve and the air cylinder version in which shock absorber/accelerator piston and air cylinder piston are both integrated into one piston.

BACKGROUND OF THE INVENTION AND DISCUSSION OF PRIOR ART

Air cylinders are used in large variety of different machinery, mechanisms and devices for executing reciprocating linear motion of the weight attached to the cylinder piston rod.

To decelerate and stop moving weight without damage to the air cylinder and metal-to-metal banging, the following features are most commonly used: hydraulic shock absorbers, built-in resilient bumpers and air cushioning mechanisms, all of which have certain disadvantages.

Hydraulic shock absorbers make air cylinder systems substantially more bulky and complicated. Due to the problem of overheating, they are not suitable for high speed/high frequency applications.

Because oil cannot be compressed, there is significant mechanical impact when cylinder piston hits the hydraulic shock absorber rod at high velocity.

The built-in resilient bumpers absorb only limited amount of energy and usually bounce back after deceleration is completed.

The air cushioning mechanism's performance and problems associated with conventional air cylinders in general are discussed below:

FIG. 1 illustrates conventional air cylinder system comprising air cylinder 10, directional control valve 2, flow control valves with adjustable orifice 3 and 5 and check valves 4 and 6 permitting air flow in one direction only.

Air cylinder has air cushion mechanisms and consists of cylinder body 15 and piston 13 moving axially inside of this body; Piston is sealed against body inner surface by sealing structure 16 and is connected to the rod 14. Cylinder body ends are closed by the front-end head 17 and rear end head 18 with cavities c and sealing structures 9.

Each end head has an inlet/outlet port and adjustable needle valve 11 or 12.

Piston rod 14 protrudes through the front-end head and is supported by bearing 20 and is sealed off from the atmosphere by a sealing structure 19.

When directional control valve 2 is in the position shown, compressed air from compressed air source 1 through directional valve 2, check valve 4, inlet port e of front end head and cavity c enters into cylinder pressurized chamber A with the pressure P1 and starts to accelerate piston 13, rod 14 and attached weight in the direction of the arrow.

Air from cylinder chamber B through rear end head cavity c, outlet port d, flow control valve 5 and directional valve 2 is being discharged to the atmosphere.

As piston velocity increases, the flow control valve 5 resistance and subsequently chamber B air pressure P2 also increase.

As a result (see FIG. 1/3), at certain point of the piston stroke (so called equilibrium point) force of the air pressure P1 in chamber A applied to the piston in arrow direction becomes about equal to the friction force and force created by air pressure P2 in chamber B, acting in opposite direction.

From this point on, the piston moves with approximately uniform velocity (so called "flow controlled" motion) up to the moment when rear cushion spear 7 engages with sealing structure 9 (see FIG. 1/2).

After this, cavity c gets closed and compressed air from chamber B could be discharged into the atmosphere through the needle valve 11 orifice b only, with much higher resistance.

This leads to the surge of pressure P2, and, as a result, piston resistance force in chamber B becomes bigger than piston driving force in chamber A, which provides moving weight deceleration.

However the air cushion mechanism as described above, has a substantial problem:

The resistance of needle valve 11 orifice b also depends on piston velocity.

As piston velocity decreases along the deceleration path of the stroke, orifice b resistance and pressure P2 also decrease which seriously affects mechanism stoppage ability. In another words cushion mechanism deceleration force is not uniform and after initial peak surge diminishes very rapidly significantly limiting deceleration capacity.

In some cases (limited intake volume of compressed air or prolonged acceleration) pressure P2 could be much lower than P1, which will make air cushion mechanism even less effective.

In addition to the problem with air cushion mechanism, practically any conventional air cylinder system has more design-inherited problems:

- 100% of compressed air volume involved in producing air cylinder piston reciprocating motion is being discharged to the atmosphere, resulting in big energy (money) loss.
- In many applications, after piston acceleration is completed and maximum velocity is reached, piston continues to move under high pressure in pressurized and discharged chambers, thus uselessly consuming extra volume of compressed air. This results in additional energy (money) loss and a large driving (propelling) force. Absorbing propelling force energy takes significant share of total absorbed energy which otherwise can be used more productively.
- Air cylinder's ability to accelerate moving weight usually substantially exceeds cylinder stoppage capacity. To make them about equal, cylinder's accelerating ability is very often unnecessary reduced (by adjusting flow control valve on discharge line). This prevents cylinder from being used to its full potential. With higher stoppage capacity, the same air cylinder could have worked in much more powerful acceleration mode.
- To start each and every piston stroke, air pressure in pressurized chamber must be built up again and again from atmospheric to the operational level. This is achieved by throttling all compressed air volume through the orifice of directional control valve, which, in turn, delays acceleration, increases stroke completion time and subsequently reduces cycling frequency thus making the cylinder less suitable for high speed, high cycling applications.

SUMMARY OF THE INVENTION

Powerful air (gas) cylinder with built-in shock absorber/accelerator, which—compared to conventional air cylinder—can move heavier weight with higher velocity/frequency cycling, consuming, at the same time, much less of the compressed air.

Air (gas) cylinder with built-in shock absorber/accelerator is developed in two versions.

Version 1.

Air (gas) cylinder combines conventional air cylinder and high frequency shock absorber/accelerator built in at any or both cylinder ends.

Conventional air cylinder consists of piston moving axially inside cylinder body and sealed against inner surface of the body by sealing structure.

Cylinder piston rod protrudes outside thru cylinder front-end block and can be connected to the moving weight.

The high frequency shock absorber/accelerator covered by Applicant's U.S. Pat. No. 6,454,061 is mounted to any one or both cylinder ends.

Shock absorber/accelerator comprises piston with sealing structures moving axially in inner chamber, which communicates with outer chamber thru aperture(s) or air line. Shock absorber/accelerator is provided with venting valve mounted in rear end block and with piston rod protruding thru front end block to the adjacent chamber of the air cylinder.

Compressed air is introduced to the air cylinder and shock absorber/accelerator by two individual air supply lines with independent adjustment of air pressure (usually low or moderate to the cylinder and high to the shock absorber/accelerator).

At certain point of the stroke, air cylinder piston meets the protruded rod of the shock absorber/accelerator piston and starts to move it thus pushing exact volume of compressed air through provided aperture from shock absorber/accelerators inner chamber to the outer chamber.

Gradually increasing resistance force created during this process effectively decelerates moving weight.

As shock absorber/accelerator piston moves further, piston sealing structures seal the air coming through the aperture thereby isolating compressed air in the outer chamber from the inner chamber. Pressure of the compressed air stored in the outer chamber can be significantly higher than in air supply line.

At the end of the stroke, shock absorber/accelerator piston actuates venting valve, which allows small amount of compressed air remaining in the inner chamber to be vented out.

Deceleration process is accomplished and shock absorber/accelerator and air cylinder pistons are brought to stop. Small return force generated by the venting valve spring is still applied to the pistons.

As a directional control valve changes direction of the compressed air flow, the compressed air is introduced to the shock absorber/accelerator's inner chamber through the open venting valve and through the inlet port to the pressurized (formerly discharged) chamber of the cylinder. This forces shock absorber/accelerator and air cylinder pistons to move simultaneously in opposite direction.

After a short piston travel, shock absorber/accelerator aperture opens and stored under high pressure compressed air rushes back from the outer to the inner chamber, powerfully accelerating shock absorber/accelerator and air cylinder pistons with attached weight.

Shock absorber/accelerator piston and air cylinder piston move together until shock absorber/accelerator stops against the end block.

At this point acceleration process is almost complete and air cylinder piston continues its motion under low/moderate air pressure until the end of the cylinder stroke.

Version 2.

Air cylinder, with built-in shock absorber/accelerator, (patented by U.S. Pat. No. 6,454,061) at any one or both ends Cylinder has a piston axially movable inside of the cylinder body and connected to the rod protruding outside of the cylinder.

The same piston works also as a compressed air pushing element for integrated shock absorbers/accelerators.

The common air supply line introduces compressed air to the air cylinder and shock absorber accelerator.

Cylinder body has two apertures for each shock absorber/accelerator. One of the apertures communicates with shock absorber/accelerator outer chamber and second one with air cylinder inlet/outlet port adjacent to the shock absorber/accelerator.

Air cylinder piston has two sets of sealing structures with the same pitch as apertures, which allows sealing both apertures at the same time at the very end of the piston stroke.

Compressed air is introduced to the pressurized chamber and forces air piston to move.

As piston velocity increases, the discharged line flow control valve resistance and subsequently air pressure in discharged chamber also increases until forces applied to the cylinder piston from both sides become almost equal. Then, the piston moves with uniform velocity, pushing compressed air from discharged chamber to the atmosphere until air cylinder outlet port on discharged line remains open.

At a certain point of the stroke, the first set of piston seal structures closes aperture communicating with discharging outlet port and prevents compressed air remaining in discharged chamber from exhausting through this port.

From this point on, compressed air is pushed from the cylinder discharged chamber through the still open second aperture to the outer chamber.

Gradually increasing resistance force, created during this process effectively decelerates moving weight.

Piston moves further and second aperture connected with outer chamber gets closed thus isolating compressed air in outer chamber from discharged cylinder chamber.

Compressed air pressure in the outer chamber could be significantly higher than the supply line pressure.

At the end of the stroke, piston actuates venting valve and the remaining compressed air is pushed outside.

After that, deceleration, in general, is completed and piston stops against cylinder end block.

Small return force generated by valve spring remains applied to the piston.

As direction control valve changes the direction of the air flow, compressed air is introduced through the open venting valve to the pressurized (formerly discharged) cylinder chamber, forcing piston to move in the opposite direction.

After a short travel, outer chamber aperture opens and compressed air enters pressurized cylinder chamber powerfully accelerating piston with connected weight.

Piston moves further and the second aperture gets open permitting compressed air from the supply line to be introduced into the pressurized chamber of the cylinder.

At this point, air pressure in the outer chamber and pressurized chamber of the cylinder are reduced and equalized to the air supply line pressure and piston continues to move under reduced air pressure until stroke is completed.

OBJECTS AND ADVANTAGES

The following are some of the important objects and advantages of the present invention:

(1) to provide an air cylinder that can move much heavier weight with the same or higher velocity and cycling frequency than comparably sized conventional air cylinder.

(2) to provide an air cylinder which consumes much less of compressed air while moving the same or bigger weight with the same or higher velocity as comparably sized conventional air cylinder (3) to provide an air cylinder with large energy (money) savings compare to conventional air cylinder in the same size category under identical circumstances.

(4) to provide an air cylinder which automatically switches from high to low air pressure in pressurized cylinder chamber and, as a result, to low driving (propelling) force after piston acceleration is completed.

(5) to provide an air cylinder in which significant part of compressed air is stored in a closed outer chamber during the retraction stroke deceleration and is being used timely to accelerate moving weight during extension stroke.

(6) to provide an air cylinder with outer chamber(s) designed and located in such a way that stored compressed air is introduced to the pressurized cylinder chamber by bypassing directional control valve and with minimum resistance, thus avoiding time and energy consuming throttling.

(7) to provide an air cylinder which safely executes stroke in any direction substantially faster than comparably sized conventional air cylinder carrying the same (or even smaller) weight.

(8) to provide an air cylinder which delivers higher cycling frequency (number of strokes per minute) than conventional air cylinder under identical circumstances, while consuming much less of compressed air.

(9) to provide an air cylinder with variety of embodiments (complexity level, outer chamber and venting valve modifications) to satisfy broad range of applications.

(10) to provide an air cylinder simple enough to be paid off in short time due to inherited ability to save energy/money, and

(11) to provide an air cylinder that incorporates a shock absorber and accelerator wherein the shock absorber and accelerator is in accordance with that disclosed in U.S. Pat. No. 6,454,061.

BRIEF DESCRIPTION OF THE DRAWINGS

FIG. 1 PRIOR ART

FIG. 1/2 Partial longitudinal cross section of air cylinder at a moment when cushion begins.

FIG. 1/3 Graph illustrating air cylinder piston velocity vs. piston stroke.

THE PRESENT INVENTION (remaining views relate to the present invention)

FIG. 2 Longitudinal cross sectional and front view of air cylinder of the present invention with shock absorber/accelerator mounted to the cylinder rear end.

Figure 3A:
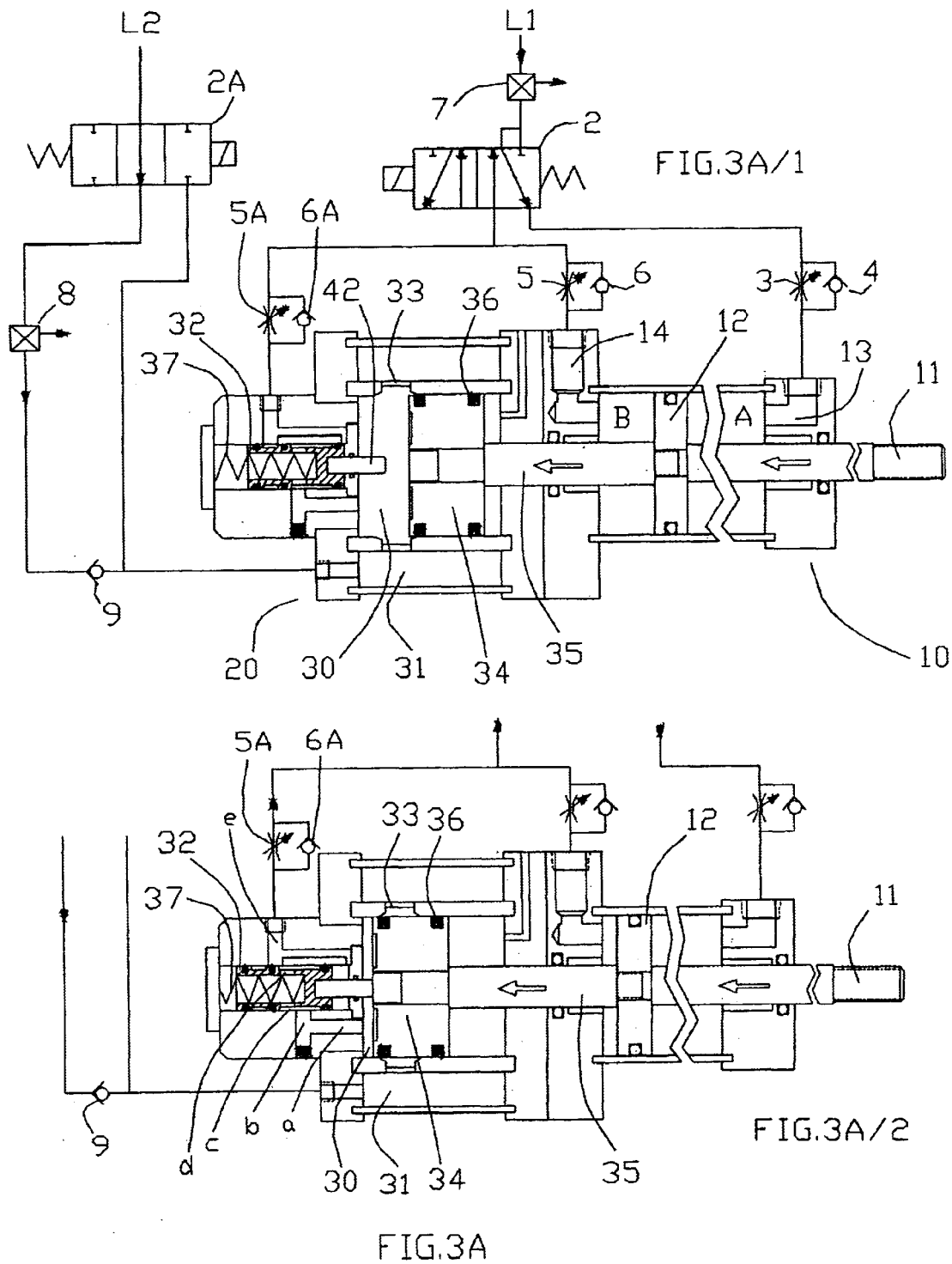

FIG. 3A Longitudinal cross-sectional view of the present invention to illustrate how FIG. 2 air cylinder works during retraction stroke.

Figure 3B:
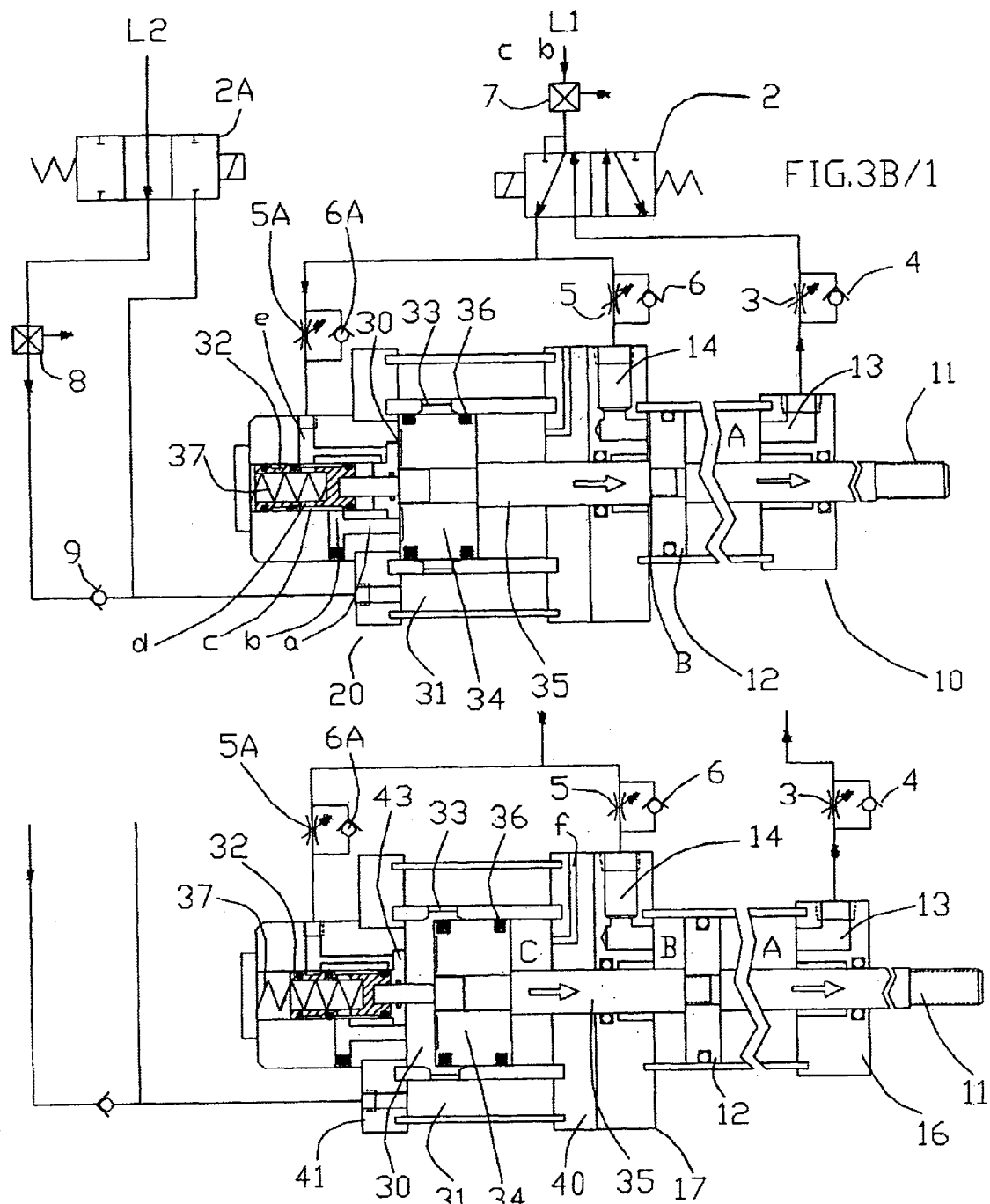

FIG. 3B Longitudinal cross-sectional view of the present invention to illustrate how FIG. 2 air cylinder works during extension stroke.

Figure 4:
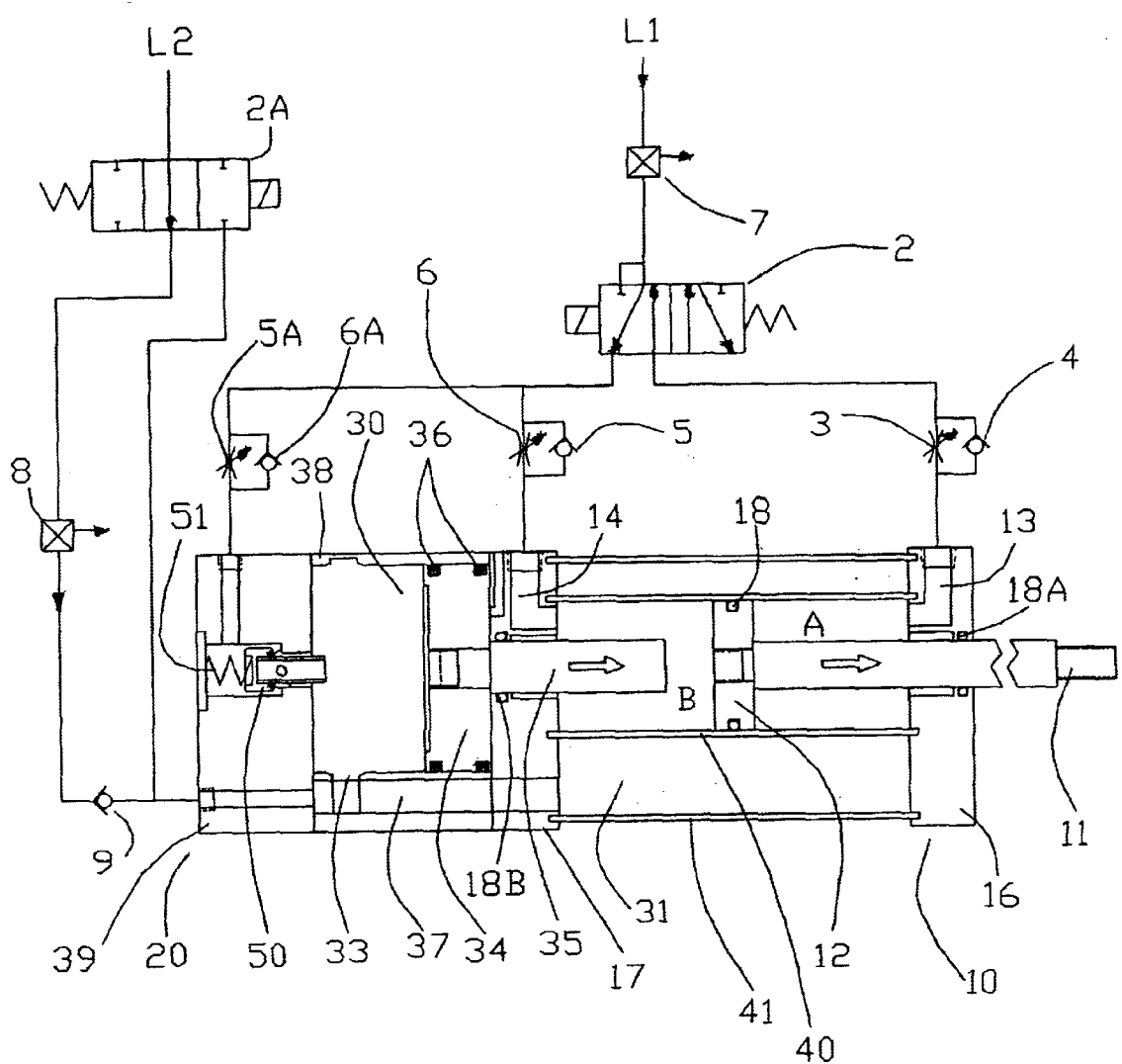
Figure 5B:
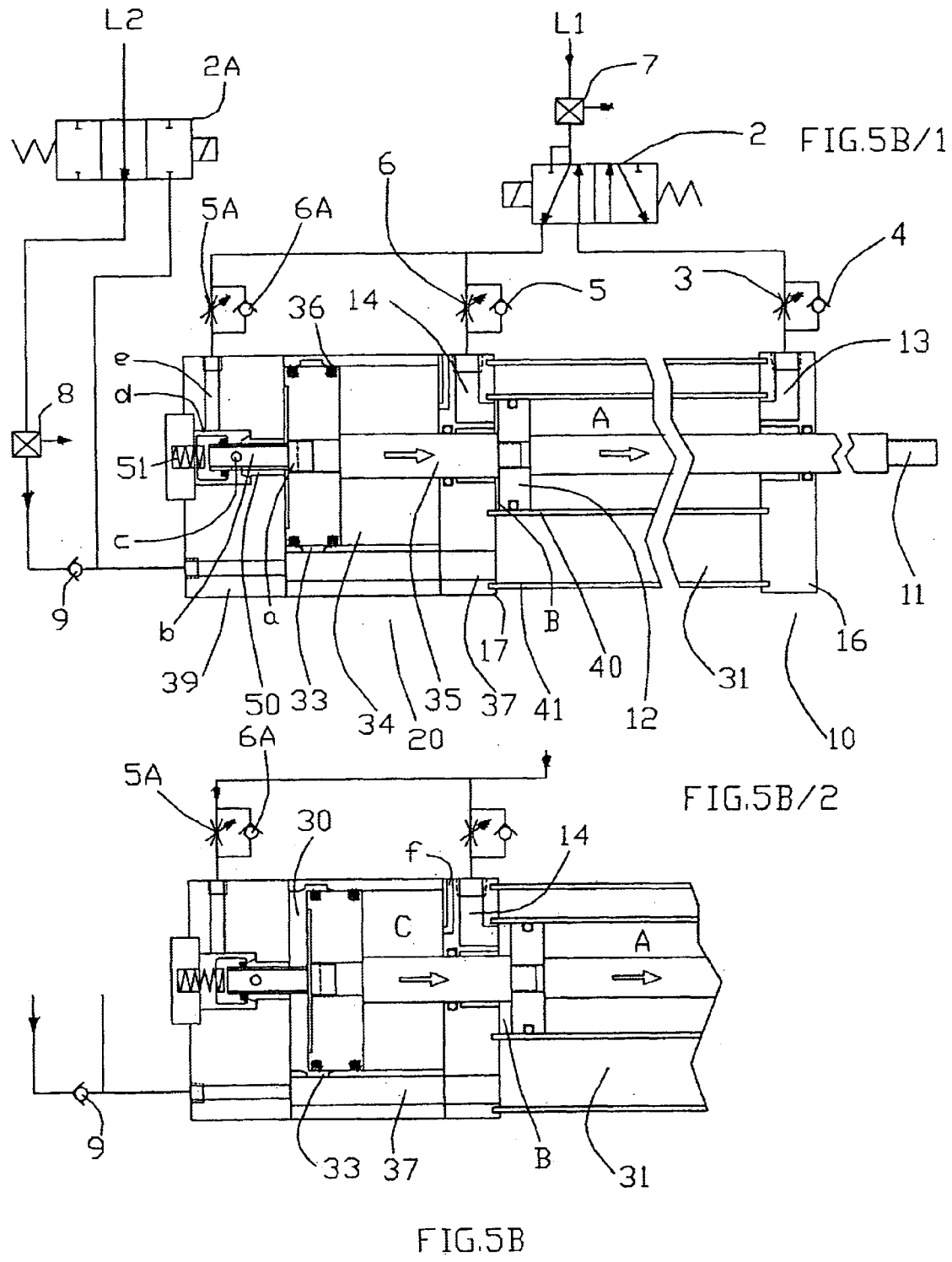

FIG. 4 Longitudinal cross sectional view and front view of double wall air cylinder of the present invention with shock absorber/accelerator mounted to the air cylinder rear end FIG. 5A Longitudinal cross-sectional view of present invention to illustrate how FIG. 4 air cylinder works during retraction stroke FIG. 5B Longitudinal view of the air cylinder of the present invention to illustrate how FIG. 4 air cylinder works during extension stroke.

FIG. 6 Longitudinal cross-section and front view of double wall air cylinder with two shock absorbers/accelerators mounted on the both ends of air cylinder.

Figure 6A:
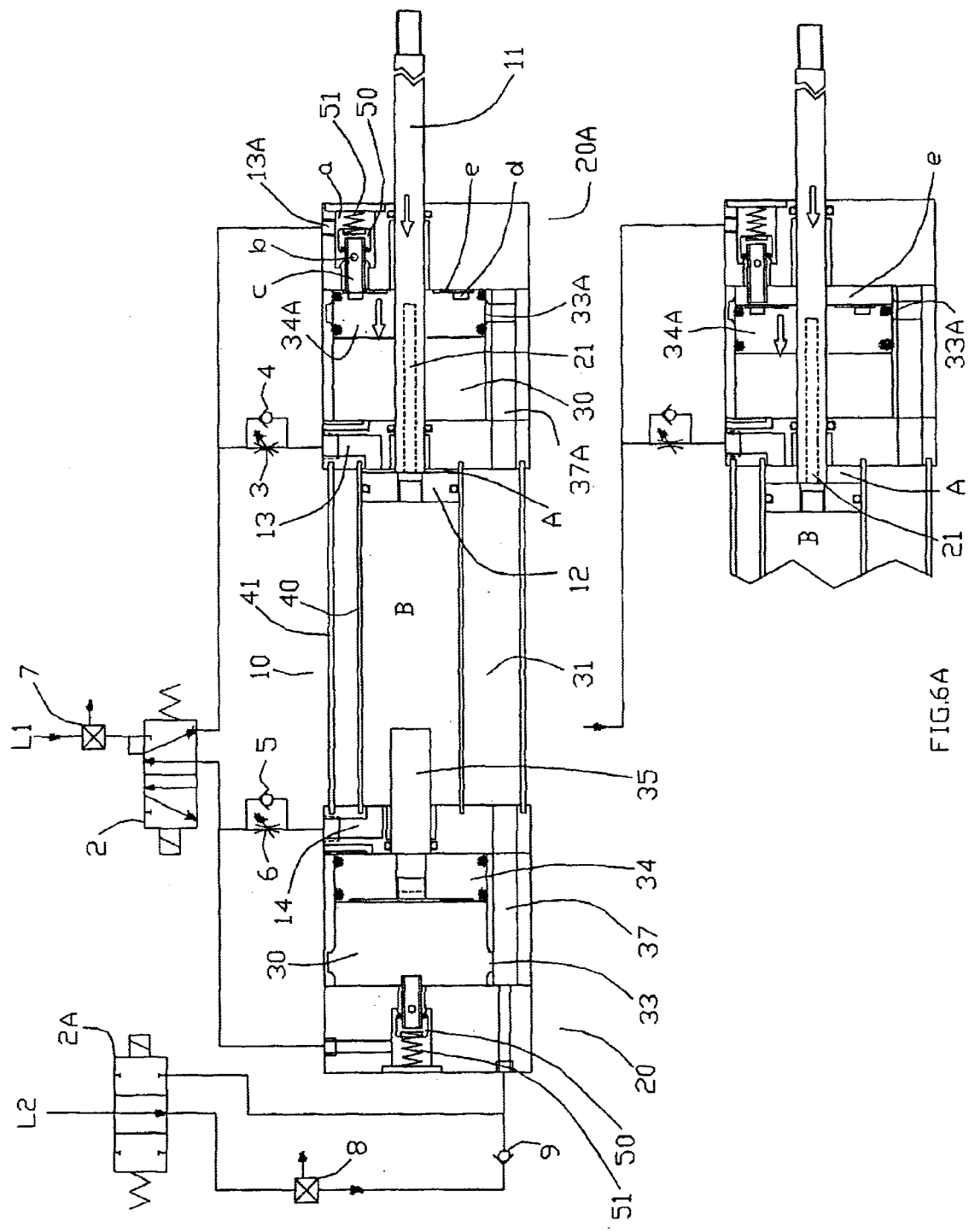

FIG. 6A Illustrates by longitudinal view how FIG. 6 air cylinder works during retraction stroke.

Figure 7:
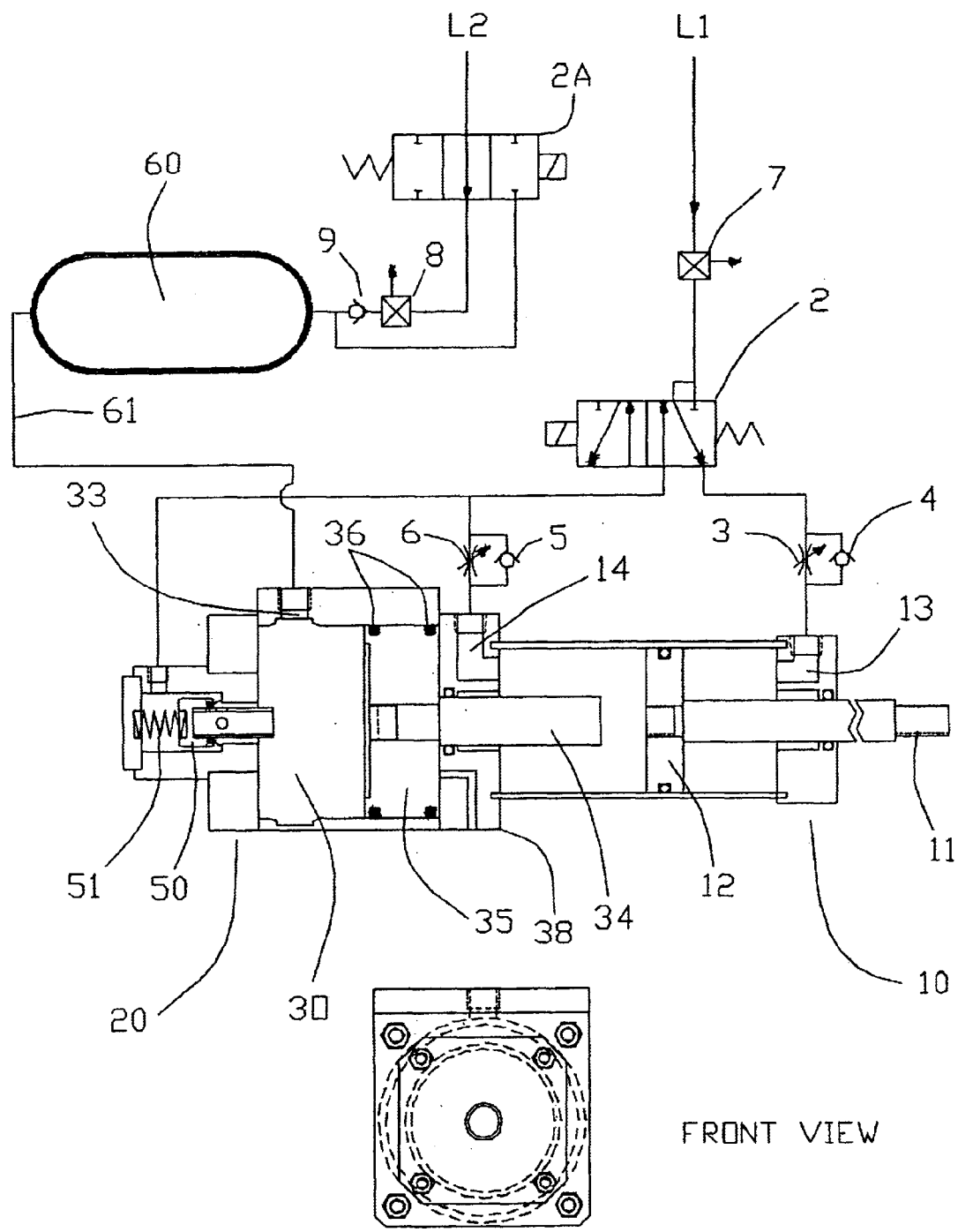

FIG. 7 Longitudinal cross section and front view of air cylinder with shock absorber/accelerator mounted to the rear end of the air cylinder and external accumulator serving as shock absorber/accelerator outer chamber, mounted outside of the cylinder and connected to shock absorber/accelerator by air line.

Figure 8:
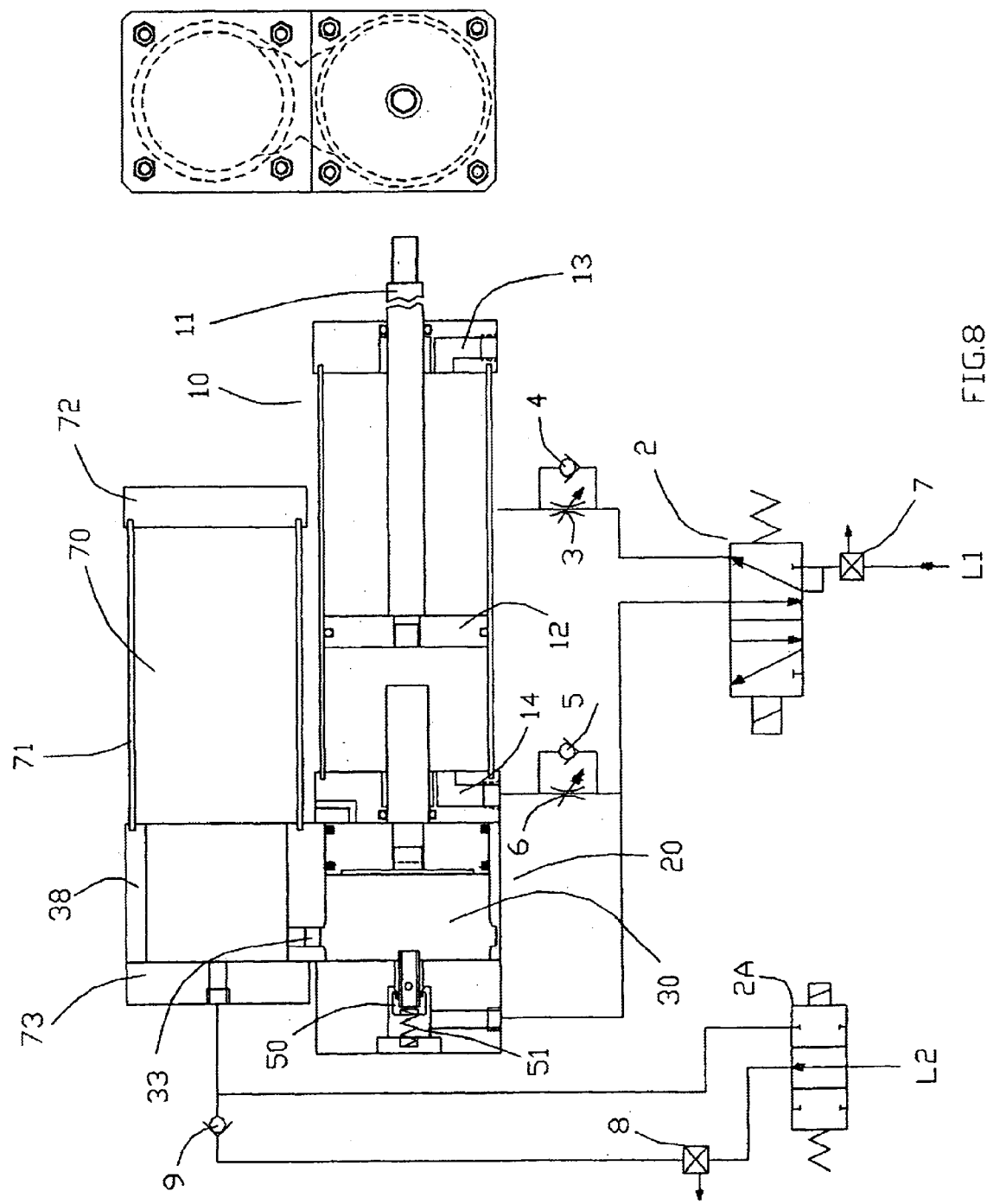

FIG. 8 Longitudinal cross section and front view of air cylinder with shock absorber/accelerator mounted to the cylinder rear end and with external accumulator mounted directly to the shock absorber/accelerator frame.

FIG. 9 Longitudinal cross-section and a front view of an air cylinder with the integrated rear end shock absorber/accelerator, with outer chamber surrounding air cylinder body.

Figure 9A:
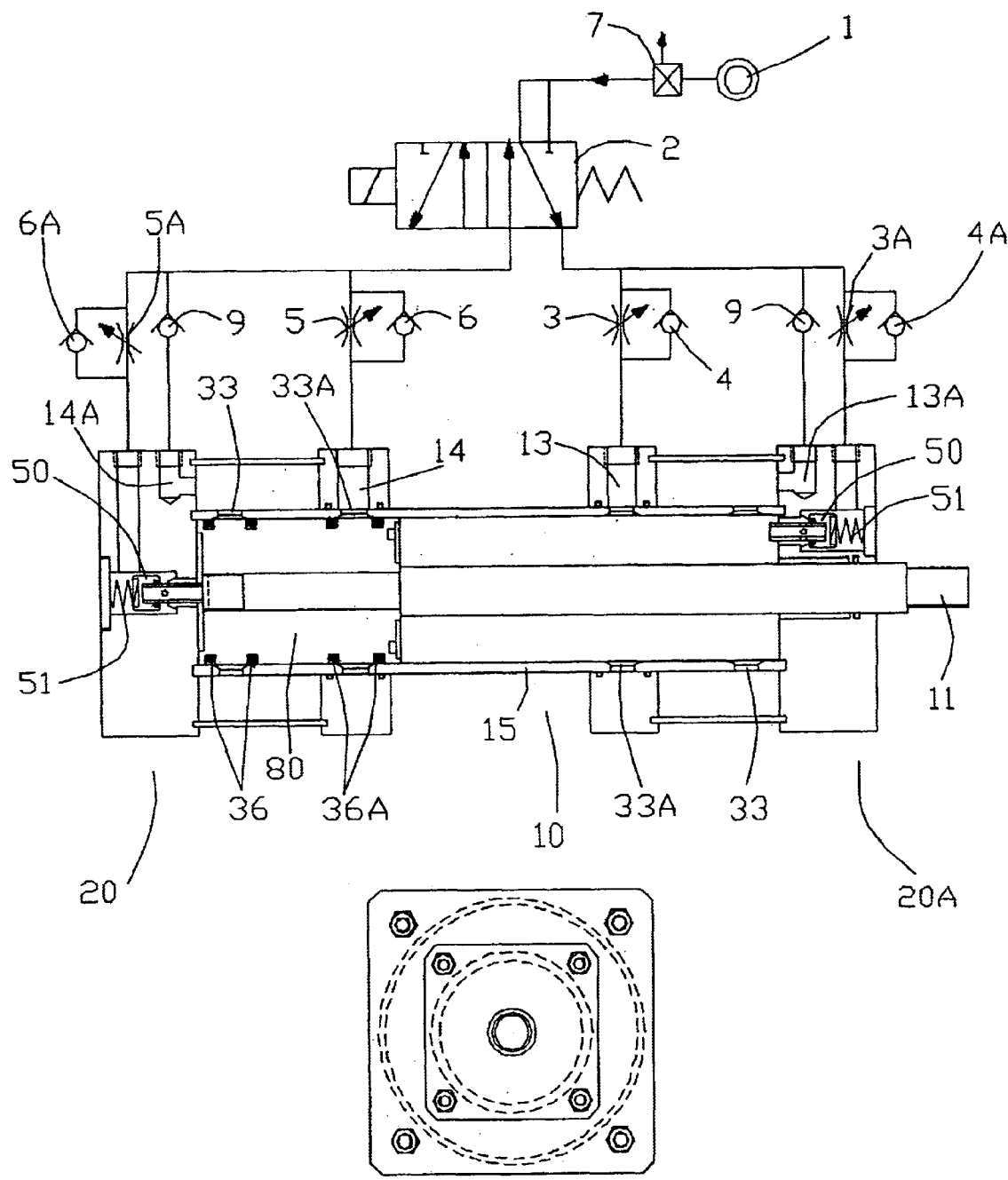

FIG. 9A Longitudinal cross-section and front view of air cylinder with integrated shock absorbers/accelerators at both ends with outer chambers surrounding air cylinder body.

FIG. 10 Illustrates how FIG. 9 air cylinder works during retraction stroke

FIG. 11 Illustrates how FIG. 9 air cylinder works during extension stroke

Figure 12:
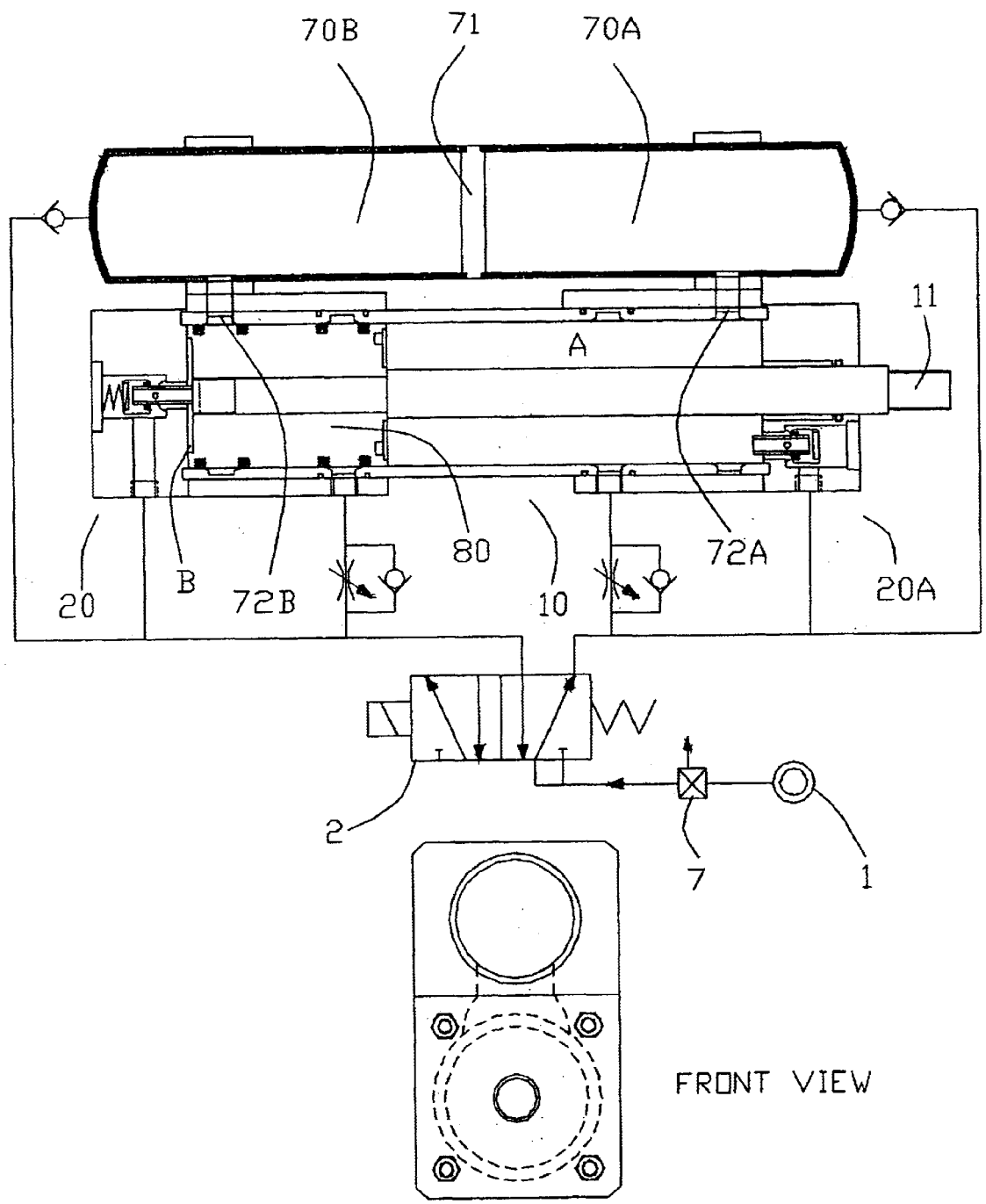

FIG. 12 Longitudinal cross-section and front view of air cylinder with shock absorbers/accelerators integrated at both ends and with external accumulator serving as outer chamber for both shock absorbers/accelerators and mounted directly on air cylinder body parallel to the cylinder axis.

FIG. 13 Longitudinal cross section and front view of air cylinder with shock absorbers/accelerators integrated at both ends and an external accumulator serving as outer chamber for shock absorbers/accelerators mounted outside of air cylinder and connected to the shock absorbers/accelerators by air lines.

Figure 14:
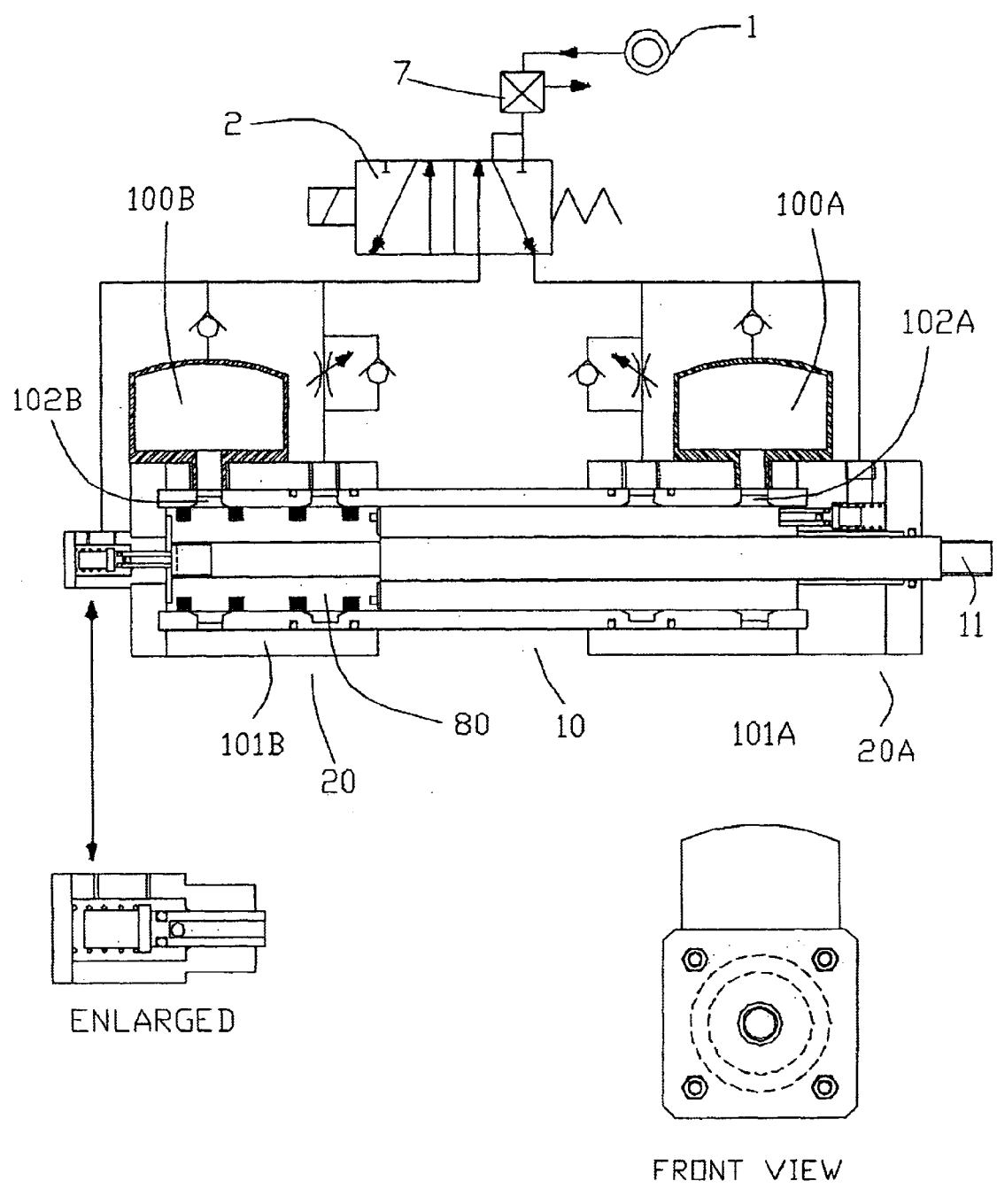

FIG. 14 Longitudinal cross section and front view of air cylinder with shock absorbers/accelerators integrated at both ends with two separate external accumulators serving as outer chamber to shock absorbers/accelerators and mounted directly to cylinder body perpendicular to the cylinder axis.

Figure 15:
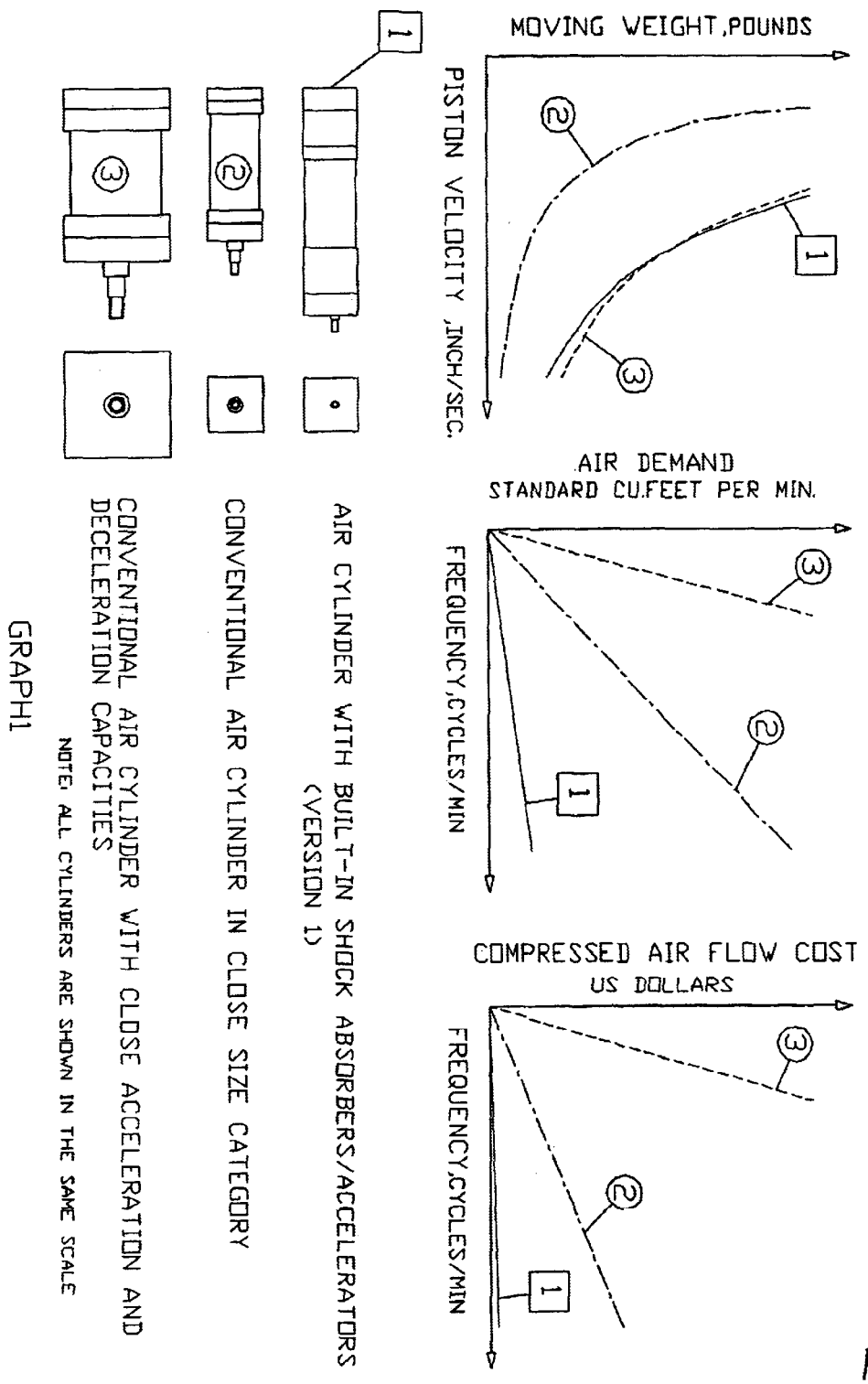

FIG. 15 Performance graphs comparing conventional air cylinder with air cushion mechanisms and air cylinders with mounted shock absorbers/accelerators and it applies to the version 1 air cylinder depicted in FIGS. 2 through 8.

Figure 15A:
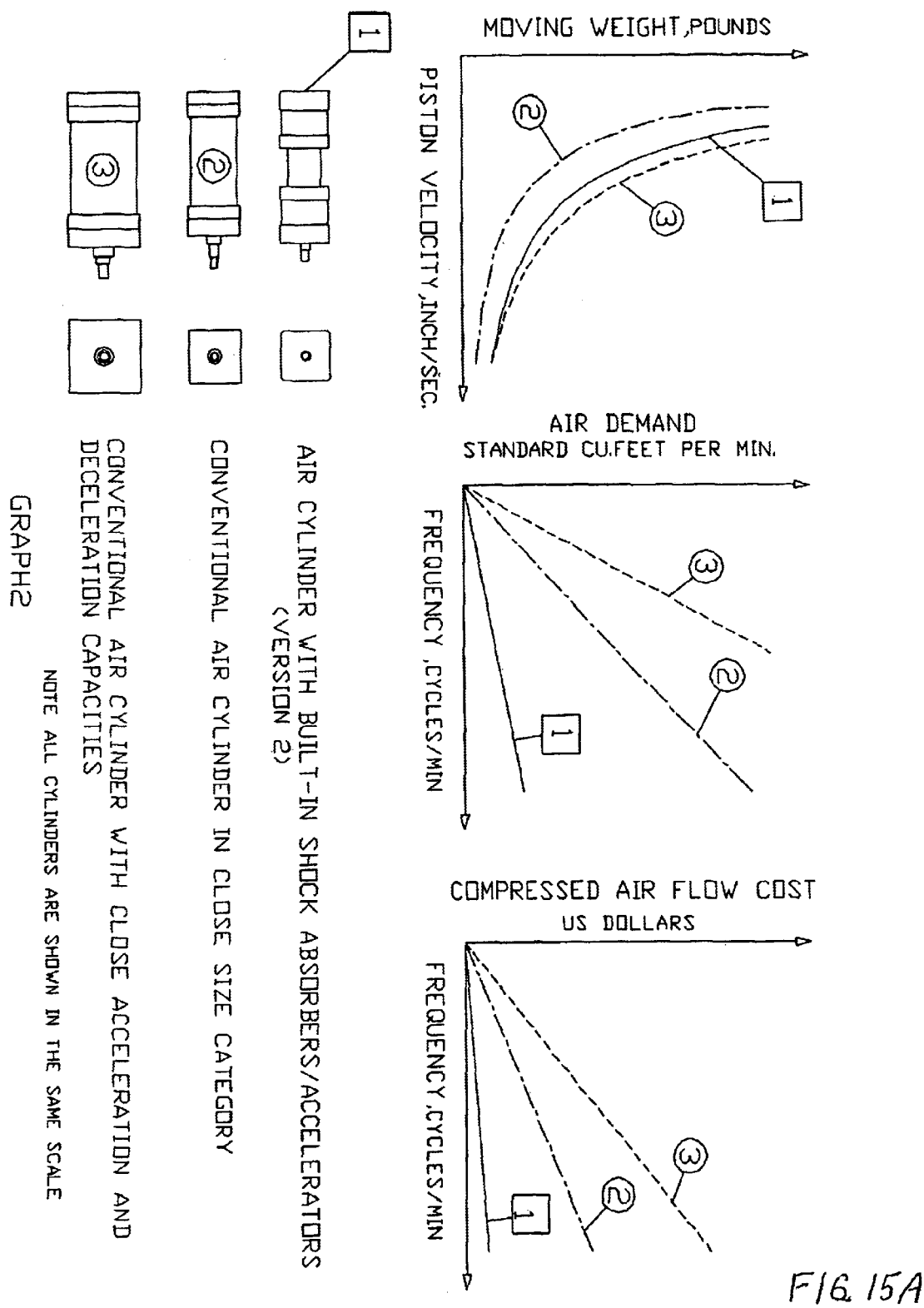

FIG. 15A Performance graphs comparing conventional air cylinder with cushion mechanisms and air cylinders with integrated shock absorbers/accelerators and it applies to the version 2 air cylinder depicted in FIGS. 9 through 14.

DETAILED DESCRIPTION OF THE PREFERRED EMBODIMENTS

Note that FIG. 2 through FIG. 8 illustrate air cylinders with mounted shock absorbers/accelerators having their own piston and separate compressed air replenish line whereas FIG. 9 through FIG. 14 illustrate air cylinders with integrated shock absorbers/accelerators having common piston and compressed air supply line with air cylinder (based on U.S. Pat. No. 6,454,061).

FIG. 2 depicts air cylinder 10 with self-contained shock absorber/accelerator 20 mounted to the rear end of an air cylinder.

Air cylinder comprises cylinder body 15, piston 12 with rod 11, front-end head 16 with front inlet/outlet 13 or front port 13 and rear end head 17 with rear inlet/outlet 14 or rear port 14. For convenience, the term "inlet/outlet" is also called port. The air cylinder is also called gas cylinder. The term cylinder gas is used to refer to the gas, typically air, that goes in and out of the ports of the air or gas cylinder.

Cylinder piston 12 moves with reciprocating motion inside of cylinder body 15. Cylinder sealing structures 18 and 18A seal piston 12 against cylinder body 15 and rod 11 against front-end head 16.

Shock absorber/accelerator consists of piston 34 with sealing structures 36, rod 35 connected to the piston, tubes 38 and 39 defining boundaries of inner 30 and outer 31 chambers, front 40 and rear 41 blocks closing ends of inner and outer chambers and spring loaded venting spool valve 32 with actuating pin 42 protruding to the inner chamber.

Inner and outer chamber are connected thru apertures 33.

Shock absorber/accelerator piston rod 35 protrudes into adjacent chamber of the cylinder and sealed by sealing structure 18B.

Air cylinder system has two independent compressed air supply lines L1 and L2.

Air pressure in these lines can be independently adjusted for variety of applications.

Line L1 provides air cylinder piston reciprocating movement and usually operates under low or moderate air pressure.

Line L1 comprises pressure regulator 7, two position directional control valve 2, flow control valves 3 and 5 and check valves 4 and 6.

Line L2 delivers compressed air to the shock absorber/accelerator chambers and usually operates under high air pressure.

Line L2 comprises pressure regulator 8, two position directional control valve 2A and check valve 9.

When directional control valve 2A is switched to the second position (not shown on the drawing) line L2 is blocked and inner and outer shock absorber accelerator chambers are connected to the atmosphere.

FIG. 2 air cylinder operation is described in details in FIG. 3A and FIG. 3B FIG. 3A (retraction stroke)

FIG. 3A/1 Compressed air from supply line L1 thru pressure regulator 7, directional control valve 2, check valve 4, and inlet port 13 introduced to the air cylinder pressurized chamber A, and pushes piston 12 with rod 11 in arrow direction.

Compressed air from line L2 thru pressure regulator 8, directional control valve 2A and check valve 9 is introduced to outer chamber 31 and thru aperture 33 to inner chamber 30 of shock absorber/accelerator.

At some point of the retraction stroke air cylinder piston 12 meets shock absorber/accelerator piston 34 rod 35 and starts pushing it in arrow direction, compressing thru aperture 33 air stored under pressure in chamber 30 into outer chamber 31.

Gradually increasing resistance force, created during this process, effectively decelerates moving weight.

Air from air cylinder chamber B thru outlet 14, flow control valve 5 and directional valve 2 is vented to the atmosphere.

Pressure of compressed air stored in outer chamber 31 could be significantly higher than pressure in air supply line L2.

FIG. 3A/2 Piston 12 moves further and sealing structures 36 seal air coming thru aperture 33 thereby isolating compressed air in the outer chamber 31 from the inner chamber 30.

At the end of the stroke piston 34 thru pin 42 pushes spool valve to the left thus opening flow control valve 5A of passage a-b-c-d-e for venting of remaining in the inner chamber 30 compressed air thru valve 2 to the atmosphere.

Flow control valve 5A can be also used for final adjustment of the piston velocity at the very end of the stroke.

After retraction stroke is fully completed the piston is located in "home position", compressed air is stored in outer chamber 31 and inner chamber 30 thru spool valve 32, outlet e and directional control valve 2 is connected to the atmosphere.

Small returned force is applied to piston 34 (and 12) by compressed spring 37.

FIG. 3B (extension stroke)

FIG. 3B/1 Directional control valve 2 is switched to shown position.

In this position compressed air from line L1 thru valve 2, check valve 6 and inlet port 14 is introduced to pressurized chamber B of air cylinder and thru inlet port e thru passage c-b-a to shock absorber/accelerator inner chamber 30.

As a result pistons 34 and 12 move simultaneously in arrow direction and the spool valve follows being pushed by spring 37.

FIG. 3B/2 After short travel piston 34 sealing structures 36 open aperture 33 and spool valve 37 stops against flange 43.

At this point, air supply to inner chamber 30 through spool valve 32 is disconnected and stored compressed air under high pressure rushes through the aperture 33 from the outer chamber 31 to inner chamber 30, powerfully accelerating piston 34 and through rod 35 air cylinder piston 12 with rod 11 and attached weight.

After piston 34 stops against block 40, acceleration process is completed and cylinder piston 12 continues its movement at designed speed under substantially lower pressure in pressurized chamber B.

Compressed air from chamber A through outlet port 13, flow control valve 3 and directional control valve 2 is being vented into the atmosphere.

FIG. 4 illustrates double wall air cylinder 10 with shock absorber/accelerator 20 mounted to the air cylinder rear end.

Air cylinder comprises double wall 40 and 41 cylinder body, piston 12 with the rod 11, front-end head 16 with inlet/outlet 13 and rear end head 17 with inlet/outlet 14.

Piston 12 moves with reciprocating motion inside of cylinder body inner tubing 40.

Space between walls 40 and 41 is used as outer chamber for shock absorber/accelerator. Sealing structures 18 and 18A seal piston 12 against tubing 40 and rod 11 against front-end head 16.

Shock absorber/accelerator comprises axially movable in body 38 piston 34 with sealing structures 36, rod 35 attached to the piston, block 39 closing body rear end and spring 51 loaded poppet valve 50 protruding inside inner chamber 30.

Shock absorber/accelerator outer chamber is defined by tubes 40 and 41 and communicates with inner chamber through passage 37 and aperture 33.

Shock absorber/accelerator piston 35 protrudes into adjacent chamber of the cylinder and sealed by sealing structure 18B.

Air cylinder system has two independent air supply lines L1 and L2.

Air pressure in these lines can be independently adjusted for variety of applications. Line L1 provides air cylinder reciprocating motion and usually operates under low or moderate air pressure. Line L1 comprises pressure regulator 7, two positions directional control valve 2, flow control valves 3 and 5 and check valves 4 and 6.

Line L2 delivers compressed air to the shock absorber/accelerator chambers and usually operates under high air pressure.

Line L2 comprises pressure regulator 8, two position directional control valve 2A and check valve 9.

FIG. 4 air cylinder operation described in details in FIG. 5A and FIG. 5B.

FIG. 5A (retraction stroke)

FIG. 5A/1 Compressed air from supply line L1 thru pressure regulator 7, directional control valve 2, check valve 4, and inlet port 13 is introduced to cylinder pressurized chamber A pushing piston 12 with rod 11 in arrow direction.

Compressed air from line L2, thru pressure regulator 8, directional control valve 2A, check valve 9 and aperture 33 enters inner chamber 30 and thru passage 37 outer chamber 31. At some point of retraction stroke piston 12 meets rod 35 of piston 34 and starts pushing it in arrow direction, compressing air already under pressure thru aperture 33 from inner chamber 30 to the outer chamber 31.

Gradually increasing resistance force, created during this process, effectively decelerate moving weight.

Air from cylinder chamber B thru outlet 14, flow control valve 5 and directional control valve 2 is vented to the atmosphere.

Pressure of compressed air stored in outer chamber 31 could be substantially higher than air pressure in supply line L2.

FIG. 5A/2

Piston 12 moves further until sealing structures 36 seal air coming thru aperture 33 thereby isolating compressed air in outer chamber 31 from the inner chamber 30.

At the end of the retraction stroke piston 34 pushes poppet valve 50 to the left thus opening passage which begins at the face of the piston 12 and continues through groove a hole b hole c recess d outlet e for venting of remaining in inner chamber 30 compressed air to the atmosphere. After retraction stroke of the air cylinder piston is fully completed the piston 12 is located in "home position", compressed air is stored in outer chamber 31 and inner chamber 30 thru poppet valve 50, outlet e, and directional control valve is connected to the atmosphere.

Small return force is applied to the piston 34 by compressed spring 51.

FIG. 5B (extension stroke)

FIG. 5B/1 Directional control valve is switched to the shown position.

In this position compressed air from line L1 thru valve 2, check valve 6 and inlet port 14 is introduced to pressurized chamber B and thru inlet port e and passage to shock absorber/accelerator inner chamber 30.

As a result, pistons 34 and 12 begin to move simultaneously in arrow direction.

Poppet valve follows being pushed by spring 51.

Compressed air from chamber A thru outlet port 13, flow control valve 3 and directional control valve 2 is being exhausted to the atmosphere.

FIG. 5B/2 After short travel piston 34 seals 36 open aperture 33 and poppet valve 50 stops against block 39.

At this point air supply to inner chamber 30 thru poppet valve 50 is disconnected and stored under high pressure compressed air enters thru aperture 33 from outer chamber 31 to inner chamber 30 powerfully accelerating piston 34 and thru rod 35 air cylinder piston 12 with rod 11 and attached weight.

After piston 34 stops against block 17, acceleration process is completed and cylinder piston 12 continues to move with uniform velocity under substantially lower air pressure in pressurized chamber B.

FIG. 6 Depicts double wall air cylinder with two shock absorbers/accelerators mounted to the both ends of air cylinder.

This embodiment has the same features as embodiment described in FIG. 4 plus additional shock absorber/accelerator 20A mounted on cylinder piston front side.

The outer chamber 31 is defined by tubes 40 and 41 and is connected to both inner chambers 30 thru passages 37 and apertures 33.

During extension stroke piston 12 pushes front side piston 34 thru two rods 21 protruding into cylinder chamber A.

FIG. 6 retraction stroke is explained in details in FIG. 6A.

FIG. 6A. Compressed air from supply line L1 thru pressure regulator 7 directional control valve 2, check valve 4 and inlet port 13 is introduced to the cylinder pressurized chamber A and thru inlet port 13A via recess a- holes b- hole c- annual groove d to shock absorber/accelerator chamber e, thus forcing both pistons to move in arrow direction.

After short travel aperture 33A gets open and compressed air under high pressure rushes from outer chamber 31 thru passage 37A and aperture 33A into chamber e powerfully accelerating piston 34A, and thru rod 21 piston 12 with attached weight.

Pistons 34A and 12 move together until piston 34A stops against end block.

Since than acceleration phase is almost accomplished and air cylinder piston 12 moves under lower pressure till the end of the cylinder stroke.

Compressed air from the cylinder discharged chamber B thru outlet port 14, flow control valve 6 and directional valve 2 is being vented outside.

FIG. 7 Illustrates embodiment of air cylinder with rear end mounted shock absorber/accelerator. This embodiment has the same features as FIG. 4 air cylinder but does not have built-in shock absorber/accelerator outer chamber. Air compressed out of inner chamber 30 by piston 34 is stored in self-contained air accumulator 60 located somewhere outside of air cylinder and connected to the inner chamber 30 with air supply line 61.

FIG. 8 Illustrates air cylinder with shock absorber/accelerator mounted to cylinder rear end, having all features described in FIG. 4 embodiment but with outer chamber 70, defined by mounted to shock absorber/accelerator body 38 tubing 71 and end blocks 72 and 73. Shock absorber/accelerator inner chamber 30 communicates with outer chamber 70 thru aperture 33.

FIG. 9 Depicts air cylinder 10 with integrated rear end shock absorber/accelerator.

Air cylinder comprises cylinder body 15, piston 80 with two sets of sealing structures 36 and 36A, piston rod 11, front end head 16 with inlet/outlet 13 and rear end head 82 with inlet/outlet 14A, inlet e and built-in spring 51 loaded venting poppet valve 50 protruding in air cylinder chamber B Cylinder body 15 has two sets of apertures 33 and 33A.

Aperture 33 communicates with outer chamber 31 defined by tubing 84, rear end head 82 and block 81 with inlet/outlet 14.

Aperture 33A communicates with inlet/outlet 14.

Linear pitches of aperture 33 and 33A and piston sealing structures 36 and 36A are equal and when seals 36 close aperture 33 seals 36A simultaneously close aperture 33A.

The air cylinder air supply system consists of compressed air source 1, pressure regulator 7, directional control valve 2, check valves 4, 5, 9 and flow controls valves 3 and 6.

FIG. 9A illustrates air cylinder 10 with both ends integrated shock absorber/accelerator. This embodiment has the same features as embodiment described in FIG. 9 plus front end integrated shock absorber/accelerator 20A.

FIG. 9 air cylinder operation is described in details in FIG. 10 and FIG. 11.

FIG. 10 (retraction stroke)

FIG. 10/1 Compressed air from source 1 thru pressure regulator 7, directional control valve 2 and check valve 4 and inlet port 13 is introduced with pressure P1 to air cylinder pressurized chamber A and pushes piston 80 with rod 11 in the arrow direction.

As piston velocity increases the flow control valve 5 resistance and subsequently air pressure P2 in discharged chamber B also increase until forces applied to the piston 80 from both sides become about equal.

Compressed air from chamber B thru outlet port 14 flow control valve 5 and directional control valve 2 is being vented to the atmosphere as long as outlet port 14 stays open.

FIG. 10/2 At certain point of stroke piston first set of structure seals 36 closes aperture outlet port 14 and prevents compressed air remaining in chamber B from exhaust thru this outlet. From this point on cylinder chamber B works as inner chamber of shock absorber/accelerator and compressed air with initial pressure P2 is pushed by piston 80 thru aperture 33 to the outer chamber 31.

Gradually increasing resistance force created during this process effectively decelerates moving weight.

FIG. 10/3 Piston 80 moves further and first set of sealing structures 36 seals compressed air coming thru aperture 33 thereby isolating compressed air in outer chamber 31 from inner chamber B.

Air pressure P2 of compressed air stored in outer chamber 31 could be significantly higher than pressure in supply line L.

At the end of the stroke piston 80 pushes poppet valve 50 to the left thus opening passage beginning at the face of piston 12 and continuing through groove a-hole b-hole c-recess d-outlet e for venting of remaining in inner chamber B compressed air to the atmosphere.

After retraction stroke of air cylinder piston is fully completed the piston 80 is located in "home position", apertures 33 and 33A are closed by sealing structures 36 and 36A, compressed air is stored with high pressure in outer chamber 31 and inner chamber thru poppet valve outlet e and directional control valve 2 is connected to the atmosphere. Small return force is applied to the piston 80 by compressed spring 51.

FIG. 11 (extension stroke)

FIG. 11/1 Directional control valve 2 is switched to the shown position.

In this position, compressed air thru directional control valve 2, passage e→d→c→b→a is introduced to the cylinder chamber B.

At the same time check valves 6 and 9 and flow control valve 5 are also connected to air pressure line.

As a result piston 80 begins to move in arrow direction and spring loaded poppet valve 50 follows.

Compressed air from chamber A thru outlet port 13, flow control valve 3 and directional control valve 2 is being vented to the atmosphere.

FIG. 11/2 After short travel seals 36 open aperture 33 and poppet valve stops against block 82. At this time air supply thru poppet valve is disconnected and high-pressure compressed air thru aperture 33 enters cylinder chamber B powerfully accelerating piston 80 in arrow direction.

FIG. 11/3 The piston 80 moves further and at certain travel point aperture 36A becomes also open.

At this point air pressure in outer chamber 31 and cylinder chamber B is decreased and equalized with pressure in air supply line L, acceleration process is completed and piston 80 continues to move being pushed by compressed air with reduced pressure, which is introduced to chamber B from supply line L thru check valve 5, inlet port 14, aperture 33A and thru check valve 9, inlet port 14A outer chamber 31 and aperture 33.

Extension stroke is completed after piston 80 stops against front-end head 16.

FIG. 12 Illustrates air cylinder 10 with both ends integrated shock absorber/accelerators 20 and 20A, with external accumulator 70 mounted directly on the cylinder and divided by partition 71 in two chambers 70A and 70B.

Chamber 70A communicates thru front shock absorber/accelerator aperture 72A with cylinder chamber A and serves as outer chamber for front shock absorber/accelerator.

Chamber 70B communicates thru rear shock absorber/accelerator aperture 70B with cylinder chamber B and serves as outer chamber for rear end shock absorber/accelerator.

Otherwise this embodiment has the same features as embodiment described in FIG. 9.

FIG. 13 Illustrates air cylinder 10 with both ends integrated shock absorber/accelerators 20 and 20A and with external accumulator 60 mounted somewhere outside of air cylinder (preferably in cylinder close vicinity).

Accumulator 60 is divided by partition 61 in two chambers 60A and 60B connected thru shock absorbers/accelerator apertures 62A and 62B with air cylinder chambers A and B and serving as outer chambers for front and rear shock absorbers/accelerators.

FIG. 14 Illustrates air cylinder 10 embodiment with both ends integrated shock absorbers/accelerators 20 and 20A and with two external accumulators 100A and 100B mounted to air cylinders end blocks 101A and 101B and serving as outer chambers for shock absorbers/accumulators.

What is claimed is:

1. A powerful gas cylinder and shock absorber and accelerator device, comprising:
   (i) a gas cylinder comprising:
      a cylinder body including a front-end head, the front end-head having a front port, and
      including a rear-end head, the rear-end head having a rear port and including a rod, the
      front port and rear port for inlet and outlet of a cylinder gas,
      a cylinder piston connected to the rod, the piston and rod movable within the cylinder body,
      cylinder sealing structures that seal the cylinder piston against the cylinder body and that seal the rod against the front-end head,
   (ii) a shock absorber and accelerator device, comprising:
      an inner chamber containing a gas,
      an outer storage chamber for containing compressed gas,
      an inner wall defining a boundary between the outer storage chamber and the inner chamber, the inner wall having an aperture defined therein,
      a piston and a piston rod, there being a clearance between the piston and the inner wall,
      the piston, upon the exertion of a force against the piston rod by the cylinder piston, moving through a retraction stroke and compressing gas in the inner chamber and driving the gas through the aperture to the outer storage chamber,
      a sealing structure that seals the clearance so that when the piston moves through a portion of the inner chamber during an intermediate portion of the retraction stroke the aperture is sealed, the aperture staying sealed during a remainder of the retraction stroke,
      a counterforce-generating member for moving the piston an initial distance to initiate an extension stroke, said initial distance being sufficient to release the sealing of the aperture,
      the piston, upon the release of the sealing of the aperture, being accelerated for a remainder of the extension stroke by compressed gas that rushes in from the outer storage chamber to the inner chamber, and
      a venting pathway from the inner chamber to an area external to the device for venting gas in the inner chamber at approximately the completion of the retraction stroke.

2. The device of claim 1, including a valve for controlling the venting pathway, the valve extending from and connecting to the counterforce-generating member.

3. The device of claim 1, wherein the aperture is situated as close to a point of a completion of the retraction stroke as possible while still being situated, so that additional movement of the piston can occur during the retraction stroke after the sealing of the clearance.

4. The device of claim 1, wherein the venting pathway terminates at an end of the device adjacent the counterforce-generating member.

5. The device of claim 1, wherein the aperture is substantially perpendicular to a direction of the retraction stroke and is large enough to minimally restrict a flow of compressed gas.

6. The device of claim 1, wherein the aperture is substantially annular and is substantially perpendicular to a direction of the retraction stroke.

7. The device of claim 1, wherein the sealing structure comprises at least two o-rings located on the piston.

8. The device of claim 1, wherein the inner chamber and the outer storage chamber are cylindrical.

9. The device of claim 1, wherein the gas is air.

10. The device of claim 1, wherein the gas is nitrogen.

11. The device of claim 2, wherein the valve includes a narrow valve member that is struck by the piston during a completion of the retraction stroke.

12. The device of claim 2, wherein the valve is a spool valve.

13. The device of claim 2, wherein the valve is a poppet valve.

14. The device of claim 1, wherein the outer chamber is within the cylinder body.

* * * * *